United States Patent
Chao et al.

(10) Patent No.: US 7,801,031 B2
(45) Date of Patent: *Sep. 21, 2010

(54) REROUTING FOR DOUBLE-LINK FAILURE RECOVERY IN AN INTERNET PROTOCOL NETWORK

(75) Inventors: Hung-Hsiang Jonathan Chao, Holmdel, NJ (US); Kang Xi, Harrison, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/934,213

(22) Filed: Nov. 2, 2007

(65) Prior Publication Data

US 2008/0130489 A1 Jun. 5, 2008

Related U.S. Application Data

(60) Provisional application No. 60/856,770, filed on Nov. 2, 2006.

(51) Int. Cl.
 *H04J 1/16* (2006.01)
(52) U.S. Cl. ..................................................... 370/228
(58) Field of Classification Search .................. 370/401, 370/228
See application file for complete search history.

(56) References Cited

U.S. PATENT DOCUMENTS

| | | | |
|---|---|---|---|
| 2005/0088965 A1* | 4/2005 | Atlas et al. | 370/216 |
| 2005/0135274 A1* | 6/2005 | Molnar et al. | 370/255 |
| 2006/0274647 A1* | 12/2006 | Wang et al. | 370/216 |
| 2007/0201355 A1* | 8/2007 | Vasseur et al. | 370/217 |
| 2007/0253416 A1* | 11/2007 | Raj | 370/390 |
| 2008/0130491 A1* | 6/2008 | Chao et al. | 370/225 |

* cited by examiner

*Primary Examiner*—Ayaz R Sheikh
*Assistant Examiner*—Hai-Chang Hsiung
(74) *Attorney, Agent, or Firm*—Straub & Pokotylo; John C. Pokotylo

(57) ABSTRACT

A router in a survivable portion of a network may forward packets to a destination node even in the event of a double-link failure. For a given destination node, the router has previously been configured with a primary port, a primary backup port, and a secondary backup port. The router receives a packet addressed to the destination node within the survivable portion of the network, wherein the packet includes information indicating that the packet has encountered a failure. The router then selects one of (A) the primary port, (B) the primary backup port and (C) the secondary backup port on which to forward the received packet, such that a backup path with no dead loops is defined. The router may obtain a recovery distance of at least one of (A) the primary backup port based on a backup path to which it leads, and (B) the secondary backup port based on a backup path to which it leads, and may further obtain counter information in a packet indicative of a failure distance. In this case, the router may select a port whose recovery distance is greater than the failure distance. The router may identify a pattern of the failure. In this case, the router may make its selection using a forwarding policy associated with the identified pattern.

10 Claims, 32 Drawing Sheets

(FAILURE PATTERN 2)

(FAILURE PATTERN 1)

(FAILURE PATTERN 4)

(FAILURE PATTERN 3)

(FAILURE PATTERN 6)

(FAILURE PATTERN 5)

REROUTING FOR DOUBLE-LINK FAILURE RECOVERY IN AN INTERNET PROTOCOL NETWORK

§0. PRIORITY CLAIM

This application claims the benefit of U.S. Provisional Patent Application Ser. No. 60/856,770 (incorporated herein by reference and referred to as "the '770 provisional"), titled: "IP FAST REROUTING FOR DOUBLE-LINK FAILURE RECOVERY," filed on Nov. 2, 2006, and listing Kang Xi and Hung-Hsiang Jonathan Chao as inventors. The present invention in not limited to requirements of the particular embodiments described in the '770 provisional.

§1. BACKGROUND OF THE INVENTION

§1.1 Field of the Invention

The present invention concerns IP networks. In particular, the present invention concerns failure recovery from double link failures using rerouting schemes that determine first and secondary backup ports within an IP network.

§1.2 Background Information

The Internet has evolved to a global information platform that supports numerous applications ranging from online shopping to worldwide business-related and science-related activities. For such a critical infrastructure, survivability is important in that services interrupted by equipment failures should be recovered as quickly as possible (See, e.g., S. Rai, B. Mukherjee, and O. Deshpande, "IP Resilience within an Autonomous System Current Approaches, Challenges, and Future Directions," *IEEE Commun. Mag.*, Vol. 43, No. 10, pp. 142-149 (October 2005).) Typically, a recovery time of tens of milliseconds satisfies most requirements (e.g., SDH/SONET automatic protection switching ("APS") is completed within 50 ms (See, e.g., T. H. Wu and R. C. Lau, "A Class of Self-Healing Ring Architectures for SONET Network Applications," *IEEE Trans. Commun.*, Vol. 40, No. 11, pp. 1746-1756 (November 1992).). At the same time, it is desired that failure recovery schemes have low complexity and do not reserve redundant bandwidth.

Network failures can be caused by a variety of reasons such as fiber cut, interface malfunctioning, software bugs, misconfiguration and attacks (See, e.g., A. Markopoulou, G. Iannaccone, S. Bhattacharyya, C.-N. Chuah, and C. Diot, "Characterization of Failures in an IP Backbone," *IEEE INFOCOM* (March 2004).) Despite continuous technological advances, failures have occurred even in well maintained networks.

An important issue of failure recovery is how to set up a new path to replace a damaged one. The main approaches used by today's IP networks are route recalculation and lower layer protection. Each is introduced below.

Routing protocols (such as open shortest path first ("OSPF") (J. Moy. OSPF version 2, RFC 2328 (Standard) (April 1998)) and intermediate system to intermediate system intra-domain routing ("IS-IS") are typically designed to perform failure advertising, route recalculation and routing table update to recover from failures. Although these mechanisms can deal with various types of failures, the time for the recovery process can easily reach seconds. Such delays can lead to long service disruptions, dropped packets, latency, etc., to an extent unacceptable for certain applications (such as stock trading systems, for example).

On the other hand, lower layer protection achieves fast recovery by establishing backup connections in advance (e.g., a time slot channel). These previously established backup connections are used to quickly replace damaged connections. In this case, the IP layer can be protected from failures without any modifications on the routing tables. However, this type of approach reserves redundant bandwidth (such as redundant links or channels on links, redundant ports, etc.) for the backup connections. More importantly, relying on lower layer protection means the IP layer is not independent in term of survivability. From this point of view, an original objective of packet switching—to design a highly survivable network where packet forwarding in each router is adaptive to the network status—is still not fully achieved (See, e.g., P. Baran, "The Beginnings of Packet Switching Some Underlying Concepts, *IEEE Commun. Mag.*, Vol. 40, No 7, pp. 42-48 (July 2002).).

The framework of IP fast rerouting ("IPFRR") is described in a recent draft of Internet Engineering Task Force ("IETF"). (See, e.g., M. Shand and S. Bryant, "IP fast reroute framework," *Internet-Draft*, October 2005. Basically, IPFRR lets a router maintain (the identity of) a backup port for each destination and use the backup port to forward packets when the primary port fails. Since the backup ports are determined in advance and do not occupy or otherwise reserve redundant bandwidth, IPFRR can achieve fast failure recovery with great cost-efficiency.

IPFRR and the following presume that failure detection has already occurred (e.g., using known or proprietary techniques). Examples of known failure detection techniques are described in the articles, L. Fang, A. Atlas, F. Chiussi, K. Kompella, and G. Swallow. "LDP Failure Detection and Recovery," *IEEE Commun. Mag.*, Vol. 42, No. 10, pp. 117-123 (October 2004), and S. Q. Zhuang, D. Geels, I. Stoica, and R. H. Katz. "Fast IP Network Recovery Using Multiple Routing Configurations," *IEEE INFOCOM*, Vol. 3, pp. 2112-2123 (March 2005).

IP fast rerouting (IPFRR) has gained much attention for network survivability. The idea of IPFRR is to proactively calculate backup ports that can be used to replace primary ports temporarily until the subsequent route recalculation is completed. FIGS. 1A-1C shows an example with node 1 as the destination. In normal operation, each router forwards packet to its primary port. When link 1-2 fails, node 2 and node 4 switch to their backup ports immediately to resume packet forwarding. FIG. 2 shows that IPFRR resumes disrupted services immediately after a failure is detected, meanwhile, route recalculation can be performed to find optimal paths in the new topology. The main challenges of IPFRR are how to find the backup ports and how to coordinate routers during recovery to avoid forwarding loops. Several IPFRR-related schemes have been proposed. (See, for example, A. Atlas, "Basic Specification for IP Fast-Reroute: Loop-Free Alternates," Internet-Draft (February 2005); S. Bryant, M. Shand, and S. Previdi, "IP Fast Reroute using Not-Via Addresses," *Internet-Draft*, (October 2005); A. Kvalbein et al., "On Failure Detection Algorithms in Overlay Networks," *IEEE INFOCOM*, (April 2006); S. Lee, Y. Yu, S. Nelakuditi, Z. Zhang, and C.-N. Chuah, "Proactive vs Reactive Approaches to Failure Resilient Routing," *IEEE INFOCOM*, (March 2004); C. Perkins, "IP Encapsulation within IP," *RFC 2003 (Proposed Standard)* (October 1996); M. Shand and S. Bryant, "IP Fast Reroute Framework," Internet-Draft, (October 2005); K. Xi and H. J. Chao, "IP Fast Rerouting for Single Link/Node Failure Recovery," *Polytechnic Univ. Technical Report*, (2006); U.S. patent application Ser. No. 11/786,417 (incorporated herein by reference), titled: "DETERMINING REROUTING INFORMATION FOR SINGLE-LINK FAILURE RECOVERY IN AN INTERNET PROTOCOL NETWORK," filed on Apr. 10, 2007, and listing Hung-Hsiang Jonathan CHAO and Kang XI as inventors; U.S. patent application Ser. No. 11/786,416 (incorporated herein by reference), titled "DETERMINING REROUTING INFORMATION FOR SINGLE-NODE FAILURE RECOVERY IN AN INTERNET PROTOCOL NETWORK," filed on Apr. 10, 2007, and listing Hung-Hsiang Jonathan CHAO and Kang XI as inventors.

; X. Yang and D. Wetherall, "Source Selectable Path Diversity Via Routing Delfections," *ACM Sigcomm* (2006); Z. Zhong, S. Nelakuditi, Y. Yu, S. Lee, J. Wang, and C.-N. Chuah, "Failure Inferencing Based Fast Rerouting for Handling Transient Link and Node Failures," *IEEE Global Internet*, (March 2005).). Each of these references is incorporated herein by reference. Almost all of the references consider single-link failures or single node failures only.

Therefore, it would be useful to provide an IPFRR scheme that handles double-link failures. Although double-link failures have been investigated in optical networks (See, e.g., A. Chandak and S. Ramasubramanian, "Dual-Link Failure Resiliency through Backup Link Mutual Exclusion," *IEEE Broadnets*, pp 258-267 (2005); H. Choi, S. Subramaniam, and H. Choi, "Loopback Recovery from Double-Link Failures in Optical Mesh Networks," *IEEE/ACM Trans. Netw.*, Vol. 12, No. 6, pp. 1119-1130 (2004); W. He and A. Somani, "Path-Based Protection for Surviving Double-Link Failures in Mesh-Restorable Optical Networks," *IEEE Globecom* (2003).), the solutions suggested in optical networks cannot be used in IP networks where routing is destination-based instead of flow-based. One may argue that multiple links usually do not fail simultaneously, thus the study of double-link failure recovery is of less importance. However, when an IP topology is built on top of a WDM network, the failure of a single fiber disconnects all the logical links it carries, which results in multiple simultaneous failures and is called shared-risk link-group (SRLG) problem (See, e.g., L. Shen, X. Yang, and B. Ramamurthy, "Shared Risk Link Group (SRLG)-Diverse Path Provisioning under Hybrid Service Level Agreements in Wavelength-Routed Optical Mesh Networks," *IEEE/ACM Trans. Netw.*, Vol. 13, No. 4, pp. 918-931 (August 2005); and D. Xu, Y. Xiong, C. Qiao, and G. Li, "Failure Protection in Layered Networks with Shared Risk Link Groups," *IEEE Netw.*, Vol. 18, No. 3, pp. 36-41 (May 2004.).) Therefore, it would be useful to provide a double-link failure recovery scheme for IP networks or networks in which routing is destination-based.

§1.2.1 Previous Approaches to IP Fast Rerouting, and Perceived Limitations of Such Approaches A simple scheme related to IPFRR is equal cost multi-paths ("ECMP"), where a number of paths with the same cost are calculated for each source/destination pair. (See, e.g., A. Iselt, A. Kirstdter, A. Pardigon, and T. Schwabe, "Resilient Routing using ecmp and mpls," *IEEE High Performance Switching and Routing (HPSR)* (April 2004).) A failure on a particular path can be handled by sending packets along an alternate path. This approach has been implemented in practical networks. However, equal cost paths might not exist in certain situations (such as in a ring). Thus, it has been reported that ECMP cannot guarantee 100% failure recovery.

A scheme to find loop-free alternate paths is presented in the paper, A. Atlas, "Basic Specification for IP Fast-Reroute: Loopfree Alternates," *Internet-Draft*, (February 2005). Consider the routing from S to D. If S has a neighbor X that satisfies $d(X,D)<d(X,S)+d(S,D)$, where $d(i,j)$ is the cost from i to j, it can send packets to X as an alternate path. The condition ensures that packets do not loop back to S. Similar to ECMP, this scheme does not guarantee 100% failure recovery since a node might not have a neighbor X that satisfies the foregoing condition.

The paper S. Bryant, M. Shand, and S. Previdi, "IP Fast Reroute using Not-Via Addresses," *Internet-Draft*, (October 2005) proposes a scheme to set up a tunnel from node S to node Y that is multiple hops away. The alternate path to a destination D is from S to Y then to D. This guarantees 100% failure coverage. Unfortunately, the maintenance of many tunnels imposes extra costs, and fragmentation can occur when the encapsulated IP packet is longer than the maximum transmission unit ("MTU").

A scheme called failure insensitive routing ("FIR") for recovering from single-link failures is presented in the paper S. Lee, Y. Yu, S. Nelakuditi, Z. Zhang, and C.-N. Chuah, "Proactive vs Reactive Approaches to Failure Resilient Routing," IEEE INFOCOM (March 2004). Given a primary path S→D, FIR identifies a number of key links such that removing any of these links forces the packets go back to S. Therefore, the failure of any key links can be inferred by S if a deflected packet occurs. To provide an alternate path, FIR removes the key links and runs shortest path routing from S to D. FIR is extended to cover single-node failures in the paper Z. Zhong, S. Nelakuditi, Y. Yu, S. Lee, J. Wang, and C.-N. Chuah, "Failure Inferencing based Fast Rerouting for Handling Transient Link and Node Failures," *IEEE Global Internet* (March 2005). The scheme is also applicable to networks using ECMP. Unfortunately, it does not consider the general case of multi-path routing where the paths may not have equal cost. In addition, determining extra shortest paths can be computationally expensive.

An algorithm called multiple routing configuration ("MRC") is presented in the paper A. Kvalbein et al., "Fast IP Network Recovery using Multiple Routing Configurations," *IEEE INFOCOM* (April 2006). Under MRC, each router maintains multiple routing tables (configurations). After a failure is detected, the routers search for a configuration that can bypass the failure. After that, the index of the selected configuration is inserted into packet headers to notify each router which routing table to use. MRC achieves 100% failure coverage. Unfortunately MRC has to maintain multiple routing tables and add an extra index to packet headers.

The paper X. Yang and D. Wetherall, "Source Selectable Path Diversity via Routing Deflections," *ACM Sigcomm*, (2006), discusses how to find multiple paths between source/destination pairs using routing deflection, and derives three conditions that achieve generic path diversity. Although the scheme is not designed for a specific application, it is shown to be promising for failure recovery. Unfortunately, directly using the scheme cannot guarantee 100% failure coverage.

In view of the foregoing, it would be useful to facilitate fast failure recovery of double link failures in IP networks, preferably without introducing high complexity and/or high resource usage.

§2. SUMMARY OF THE INVENTION

A router in a survivable portion of a network may forward packets to a destination node even in the event of a double-link failure. For a given destination node, the router has previously been configured with a primary port, a primary backup port, and a secondary backup port. The router receives a packet addressed to the destination node within the survivable portion of the network, wherein the packet includes information indicating that the packet has encountered a failure. The router then selects one of (A) the primary port, (B) the primary backup port and (C) the secondary backup port on which to forward the received packet, such that a backup path with no dead loops is defined.

In at least some embodiments consistent with the present invention, the router obtains a recovery distance of at least one of (A) the primary backup port based on a backup path to which it leads, and (B) the secondary backup port based on a backup path to which it leads, and further obtains counter information in a packet indicative of a failure distance. In such embodiments, the router selects a port whose recovery distance is greater than the failure distance.

In at least some embodiments consistent with the present invention, the router may identify a pattern of the failure. In such embodiments, the router makes its selection using a forwarding policy associated with the identified pattern.

§3. BRIEF DESCRIPTION OF THE DRAWINGS

FIG. 1A illustrates the topology of a simple example IP network in which node 1 is the destination node. FIG. 1B illustrates the IP network of FIG. 1A and depicts primary ports and backup ports for each node (other than destination node 1). FIG. 1C illustrates the IP network of FIG. 1B in a scenario where node 2 and node 4 switch to their backup ports in response to a link failure.

FIG. 2 is a timing diagram illustrating a failure and the subsequent failure recovery of an IPFRR scheme.

FIG. 3A illustrates the topology of a simple example IP network in which node 1 is the destination node. FIG. 3B illustrates the IP network of FIG. 3A and depicts primary ports, first backup ports, and secondary backup ports for each node (other than destination node 1). FIG. 3C illustrates the IP network of FIG. 3B in a scenario where node 4, node 5, and node 10 switch to their first backup ports and node 7 switches to its secondary backup port in response to a double-link failure.

FIG. 7, which consists of FIGS. 7A-7D, is a flow diagram of an exemplary method for determining first and secondary backup ports of various nodes of an IP network for use in double-link failure recovery (from failure patterns 4, 5, and part of 6), in a manner consistent with the present invention.

Figure 8A:
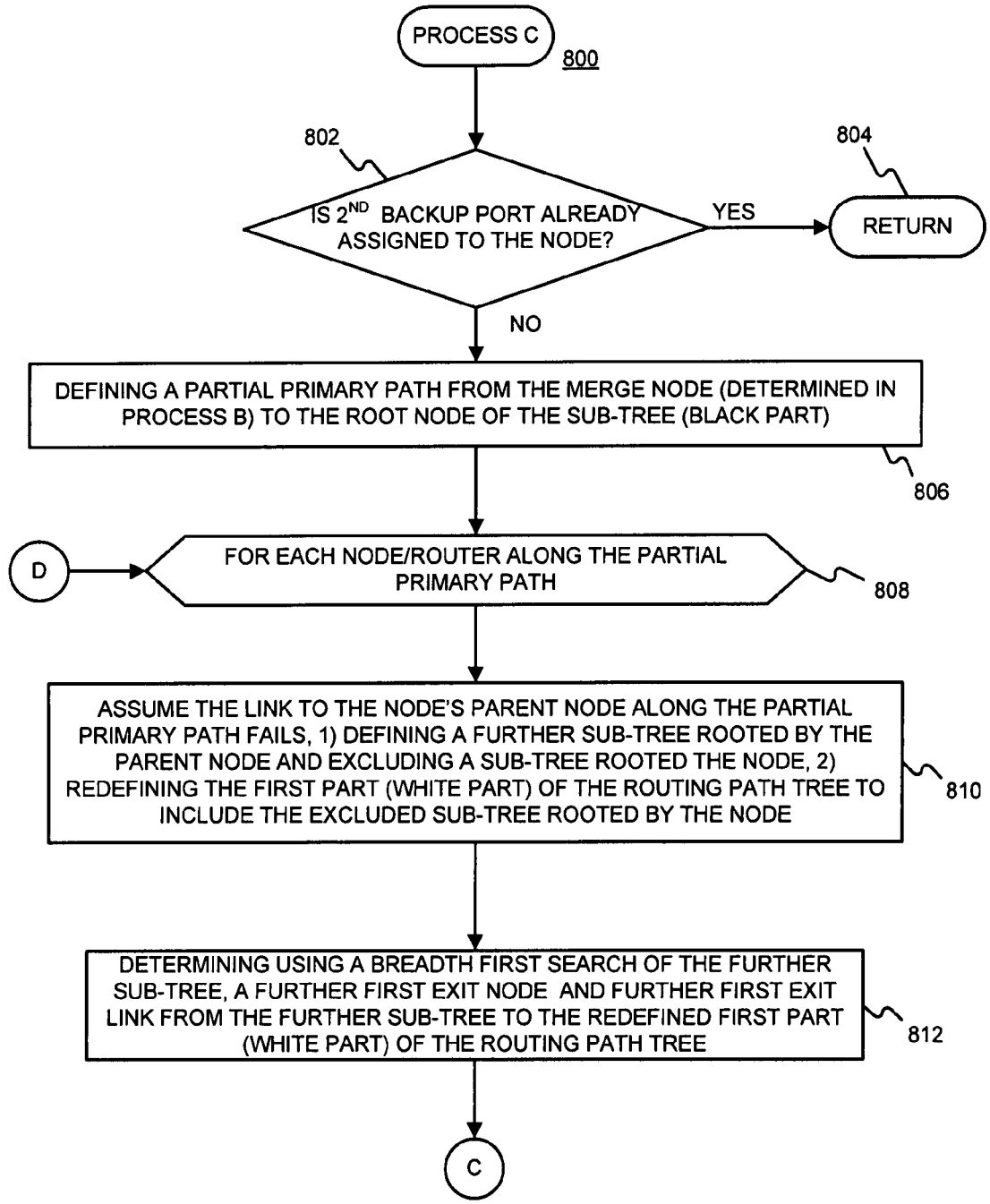
Figure 8B:
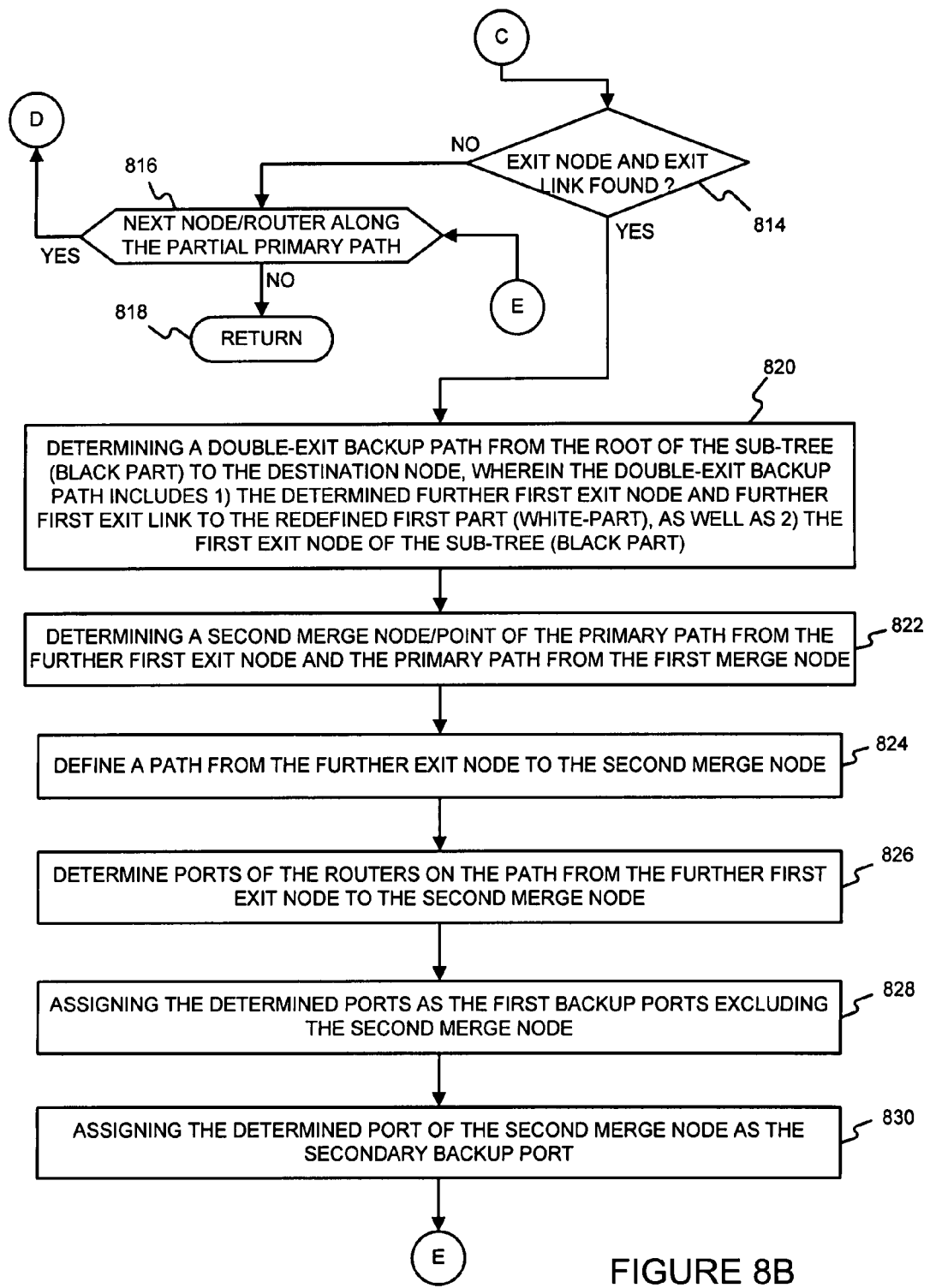

FIG. 8, which consists of FIGS. 8A and 8B, is a flow diagram of an exemplary method for determining first and secondary backup ports of various nodes of an IP network for use in double-link failure recovery (from unexplored failures in failure pattern 6), in a manner consistent with the present invention.

Figure 9A:
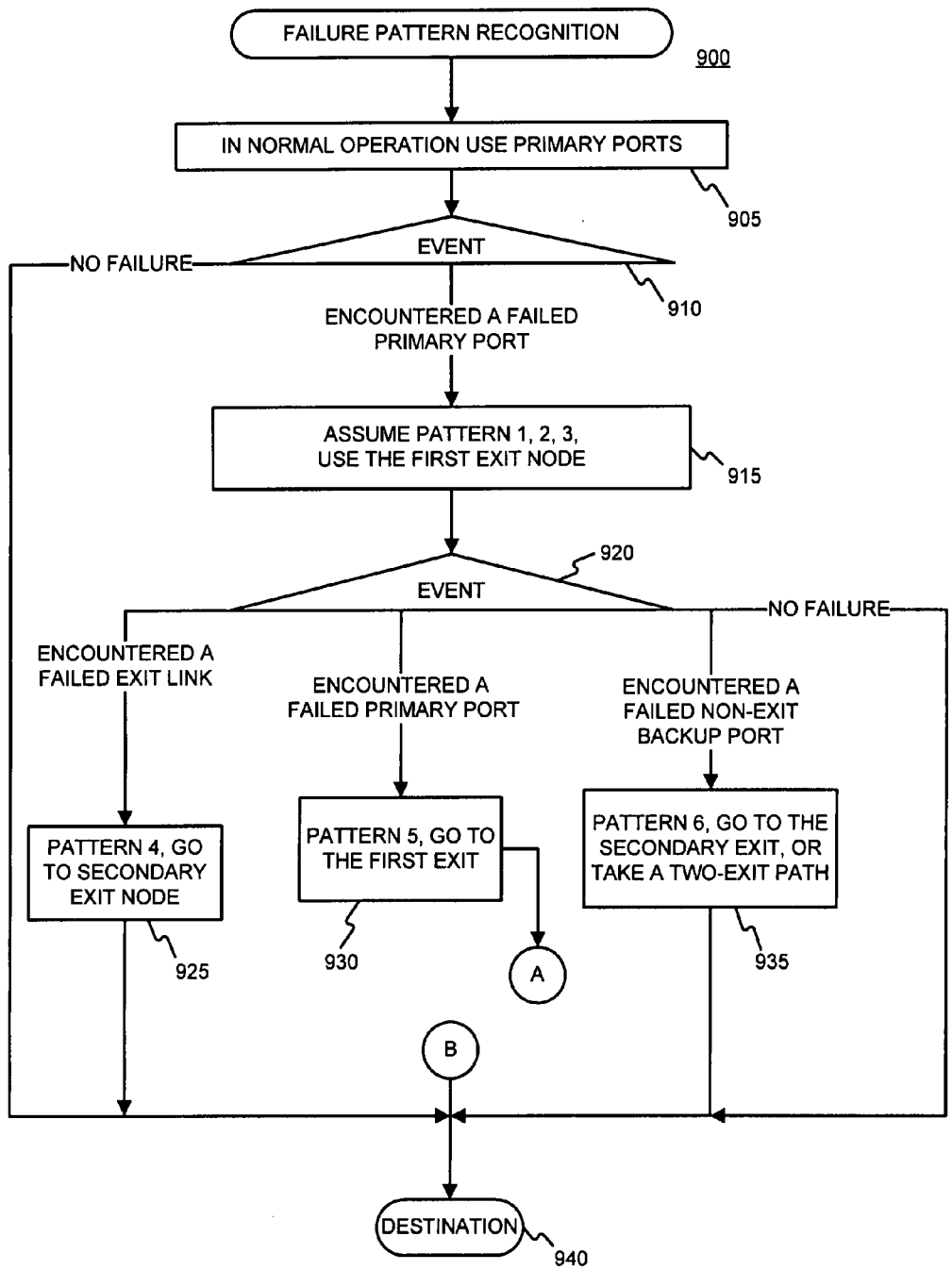
Figure 9B:
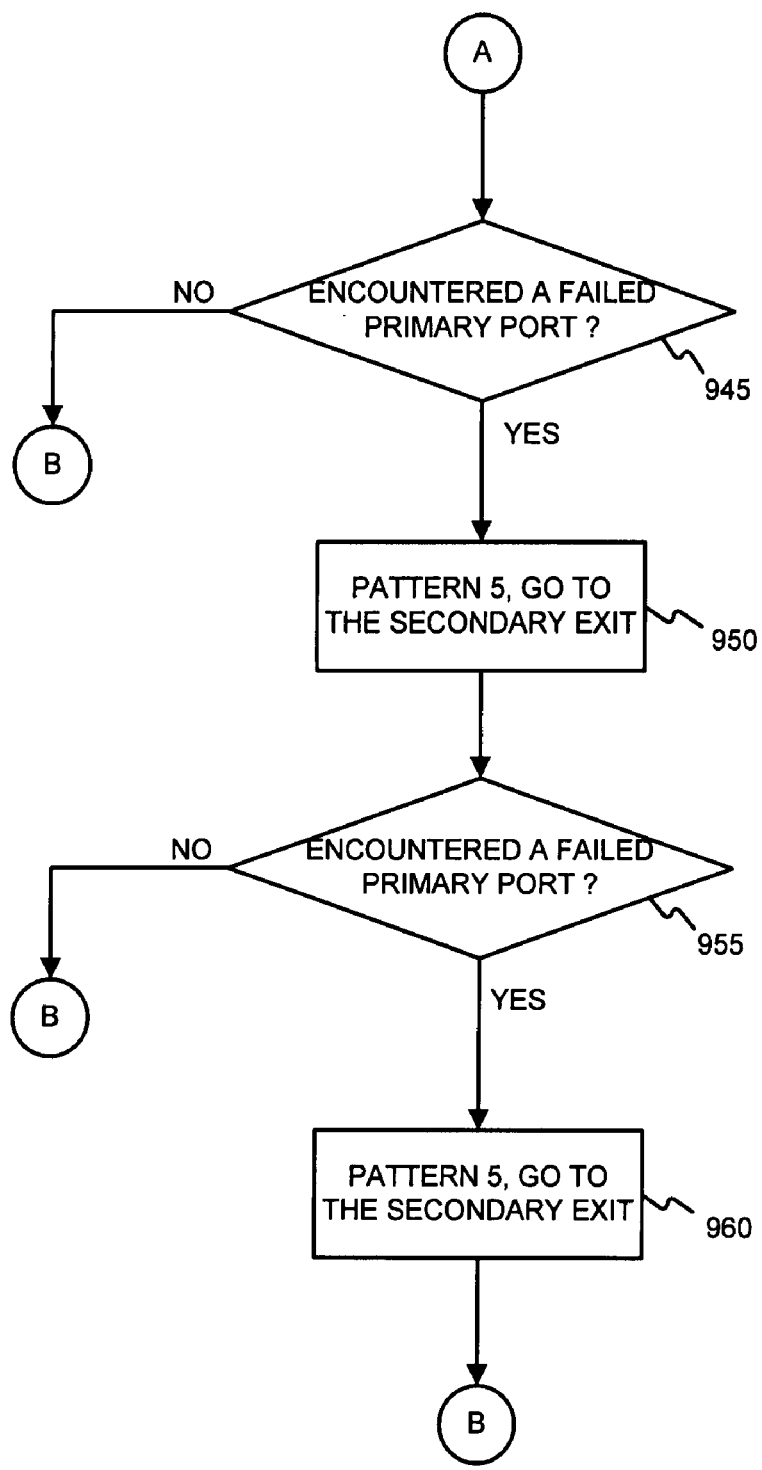

FIG. 9, which consists of FIGS. 9A and 9B, is a flow diagram of an exemplary method for recognizing failure patterns during the forwarding of a packet in a network, in a manner consistent with the present invention.

FIG. 10, which consists of FIGS. 10A-10D, illustrate examples of different cases of failure patterns 4, 5, and failure pattern 6 within an IP network, in a manner consistent with the present invention.

Figure 11:
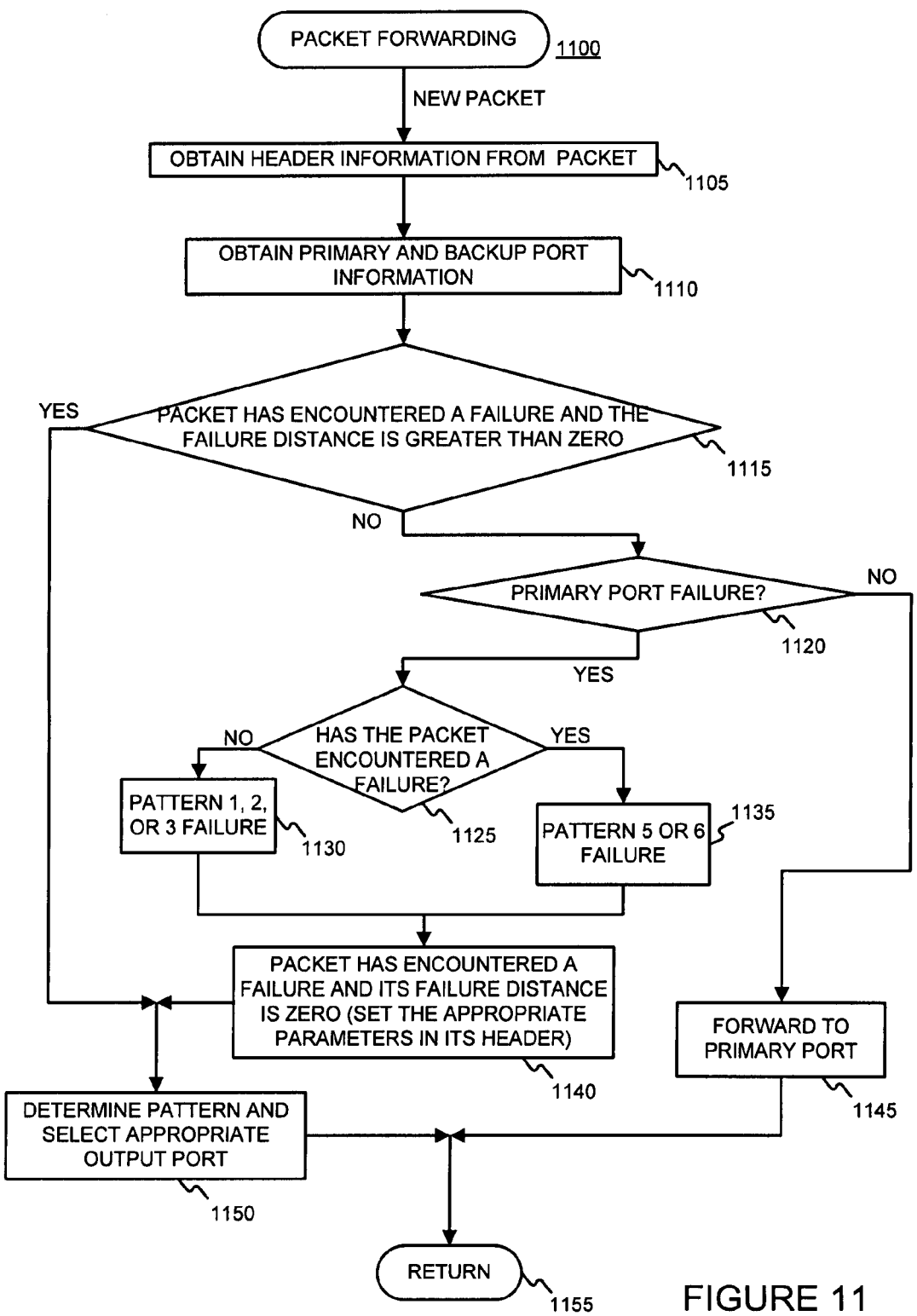

FIG. 11 is a flow diagram of an exemplary method, consistent with the present invention, for implementing a forwarding policy on routers of an IP network.

FIG. 12, which consists of FIGS. 12A-12F, is a flow diagram part of an exemplary forwarding policy, consistent with the present invention, for selecting the appropriate forwarding port as requested by the flow diagram of FIG. 11.

FIGS. 13A-13E illustrate the determination of first and secondary backup ports for nodes in an IP network topology in which the nodes have primary ports for single destination node 1, using a method consistent with the present invention.

Figure 14:
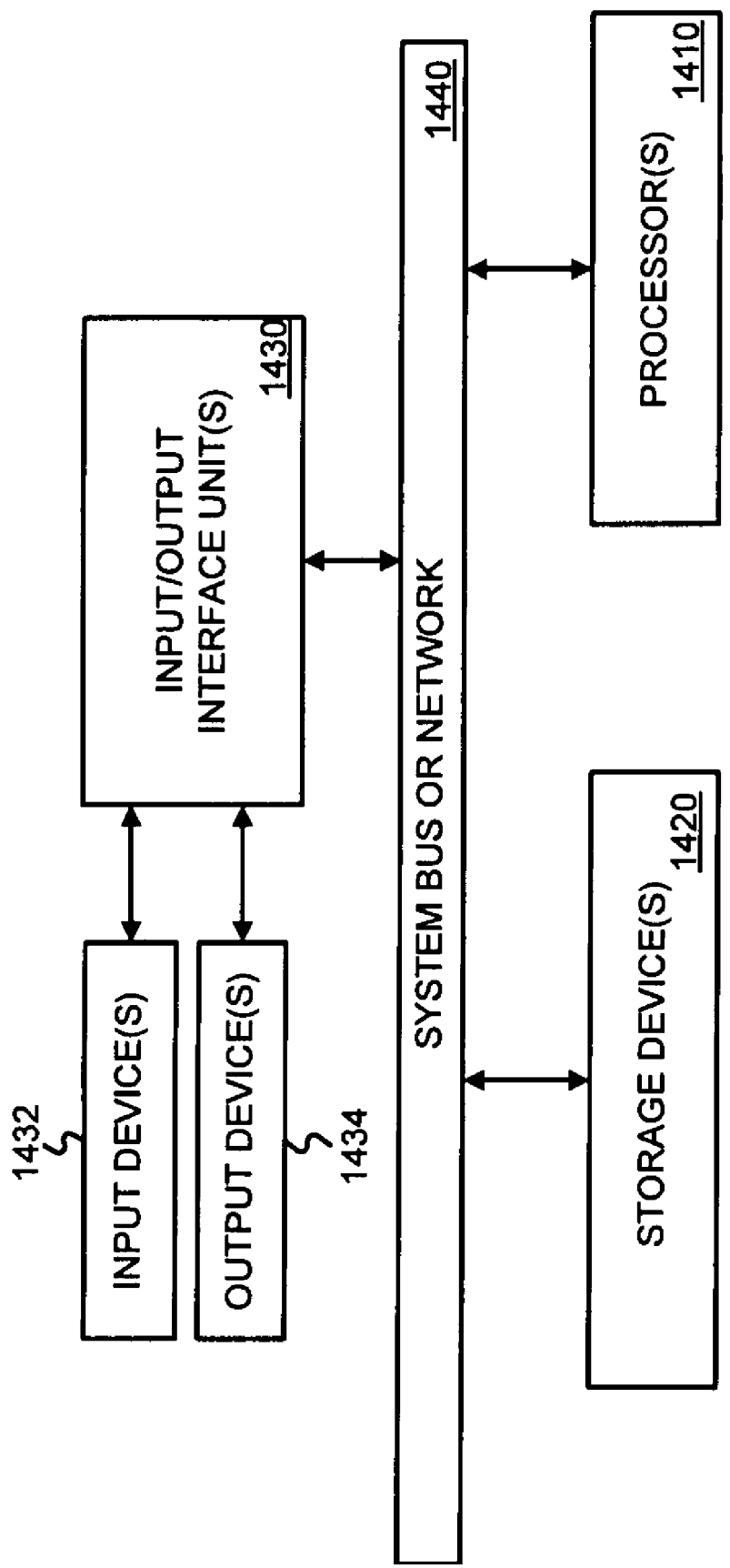

FIG. 14 is a block diagram of an exemplary apparatus that may perform various operations, and store various information generated and/or used by such operations, in a manner consistent with the present invention.

§4. DETAILED DESCRIPTION

The present invention may involve novel methods, apparatus, message formats, and/or data structures to facilitate fast failure recovery from a double link failure by determining first and secondary backup ports for nodes within an IP network. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 2:
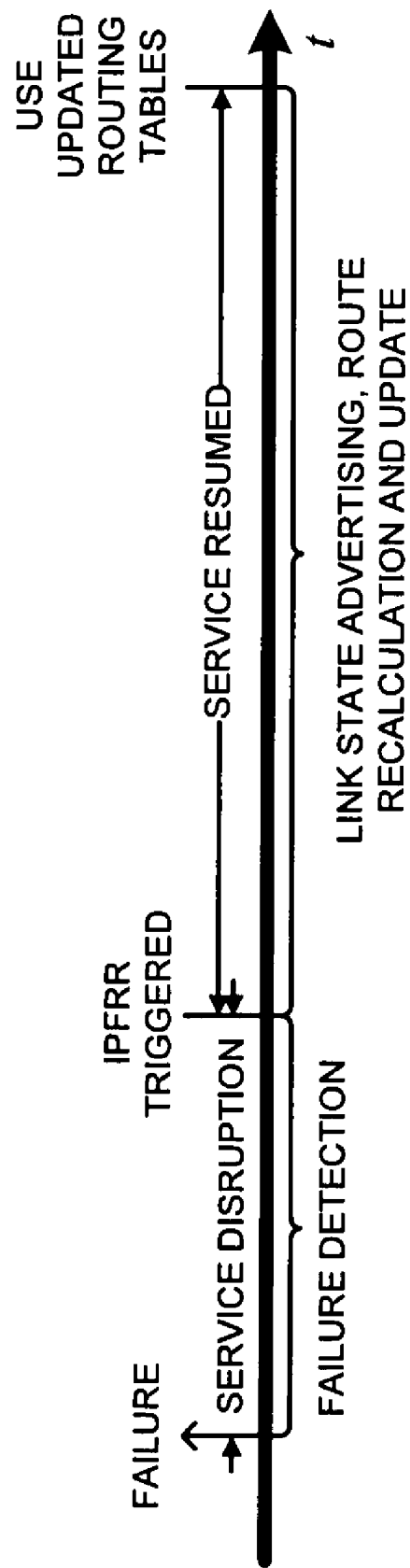
Figure 3B:
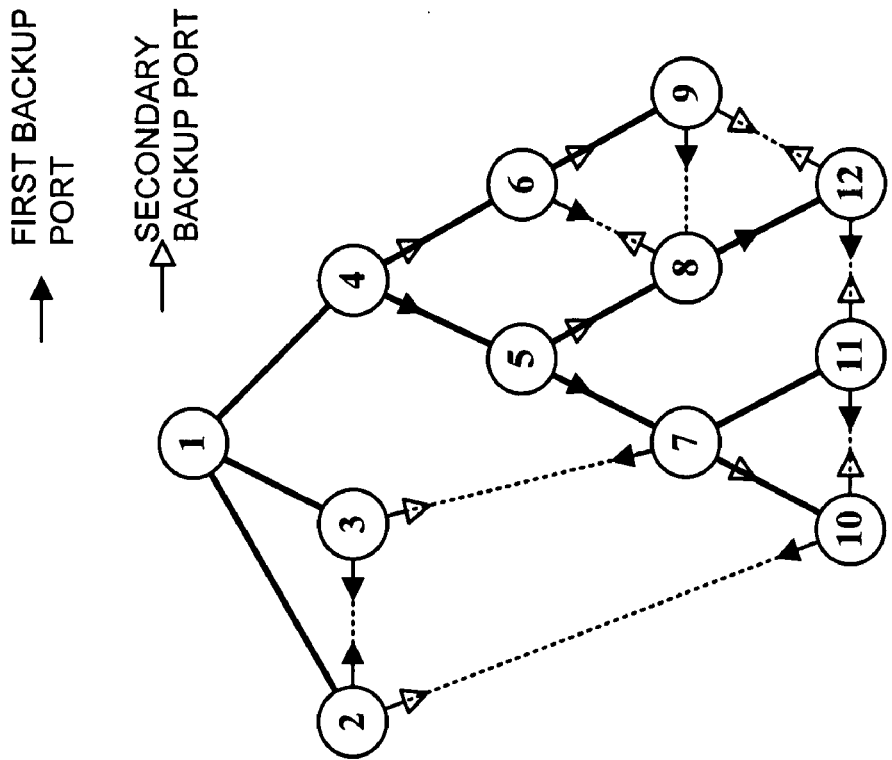
Figure 3A:
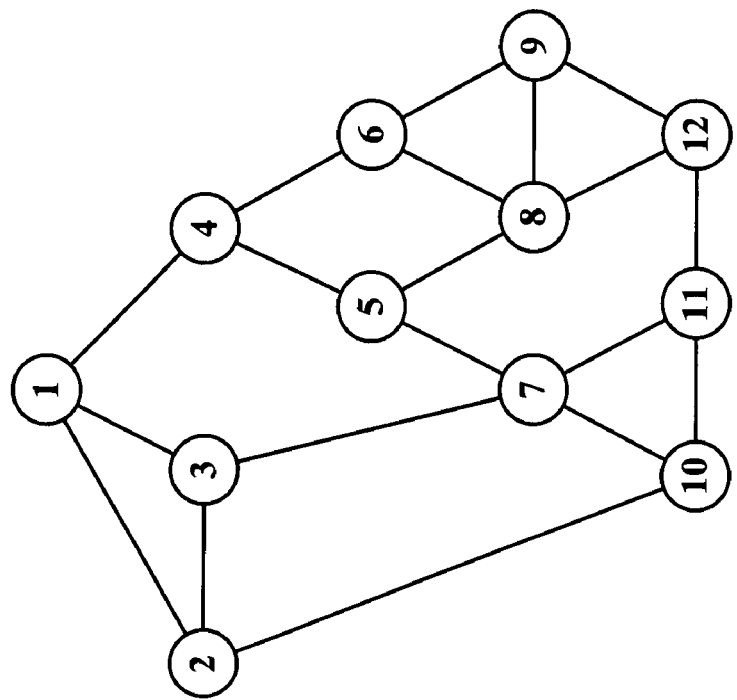

§4.1 Example of a Double-Link Failure and Rerouting in Response to Such a Failure The operation of an exemplary embodiment consistent with the present invention, in case of a double link failure in a simple IP network with nodes having primary ports and backup ports is described. FIG. 3A illustrates the topology of an IP network in which node 1 is the destination node. For simplicity, node 1 is considered as the single destination within the network. FIG. 2B depicts the primary ports and the backup ports (both the first and secondary backup ports) for each node in the IP network of FIG. 3A. The primary ports are illustrated using solid thick bold lines between the nodes and the backup ports are illustrated using solid arrows for the first backup ports and transparent arrows for the secondary backup ports. Each IP router (node) maintains a primary forwarding port for the destination node 1 (or a prefix). These primary ports may be determined, for instance, by constructing a shortest path tree using Dijkstra's algorithm and subsequently determining a primary tree accordingly. For instance, according to FIG. 3B a packet going from node 8 to node 1 would follow the route {8→5→4→1}. When a double failure occurs, some of the primary ports could point to the damaged link and become unusable. Depending on where the failures occur within the IP network, six double-link failure patters are defined which cover all possible failures. These double link failure patterns will be described in detail below.

Embodiments consistent with the present invention proactively calculate a first backup port and a second backup port that can be used to replace primary ports as well as failed exit links temporarily until the subsequent route recalculation is completed. In essence, each IP router (node) has a first backup port and a secondary backup port such that (1) in a case of no failure, all the routers use primary ports for packet forwarding and (2) in a case of failure, a subset (or in some cases, the entire set) of routers switch to the backup ports for failure recovery. FIG. 3B shows the primary, the first backup and second backup ports of the IP network taken into consideration with node 1 as the single destination node.

Figure 3C:
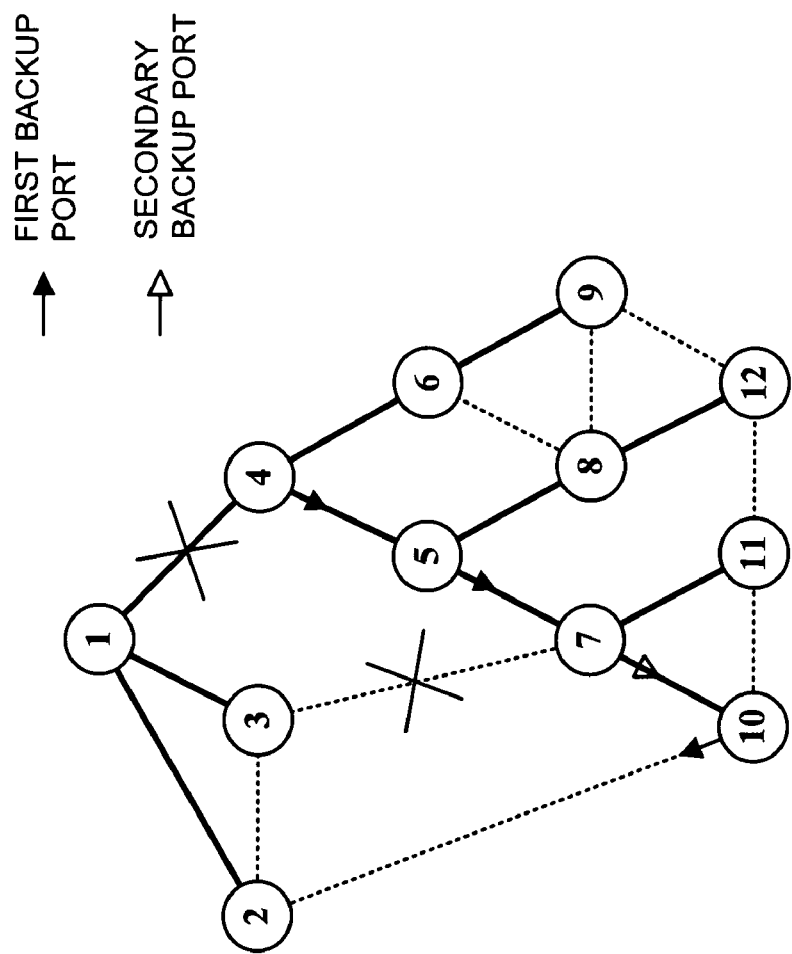

Referring now to FIG. 3C, assume that a double link failure has occurred on the link between node 1 and node 4 and the link between node 7 and node 3 respectively. Further assume that node 4 is forwarding packets to be sent to node 1 which is the destination node of the network. In such a scenario, node 4 would be aware of the failure of the link and would not be able to forward packets through its primary port to node 1. Therefore, node 4 switches to its first backup port for failure recovery (and subsequent nodes switch to their backup ports as necessary) in order to forward the packets sent by node 4 to node 1. Specifically, FIG. 3C illustrates the network topology in such a scenario where node 4 switches to its first backup port directed towards node 4, node 5 switches to its first backup port directed towards node 7, node 7 switches to its secondary backup port directed towards node 10 since its first backup port makes use of the failed link (node 7-node 3), and node 10 switches to its first backup port directed towards node 2. As a result the packets sent by node 4 to be forwarded to node 1 will follow the route {4→5→7→10→2→1}.

Determining backup ports is non-trivial because inconsistency between backup ports may create routing loops. For example, referring to FIG. 3, pointing the backup port of node 10 to node 11 would create a loop Determining how to perform failure recovery helps routers determine when to use primary ports, first backup ports and secondary backup ports. In particular, it is desired to make the decision without waiting for failure advertisement to shorten service disruption. These issues are addressed by various exemplary embodiments consistent with the present invention.

§4.2 Determining Backup Ports for Recovering from a Double-Link Failure

This section provides a detailed explanation of how to determine backup ports for double link failures in an IP network.

A process consistent with the present invention can be summarized as follows:

1) During the planning stage, find backup ports for each router; and
2) When a failure occurs, let one or more routers choose their backup ports for local rerouting, which forms backup paths with no dead loops.

The questions to be answered for double-link failure recovery are:

To guarantee 100% failure recovery, what is the minimum number of backup ports required by each router? The answer is critical to the hardware complexity since the backup ports must be stored in the routing tables. It has been proven in previous work that one backup port is sufficient for single-link/node failure recovery. This application proves that two backup ports in each router are sufficient for double-link failure recovery.

How to find the backup ports? The present inventors formulate this question as an integer linear programming (ILP). Solving the ILP directly involves high complexity. Therefore, embodiments consistent with the present invention may use a heuristic algorithm as a practical approach.

During failure recovery, how does each router choose the correct port from among its primary and backup ports without advertising the failed links?

Figure 1C:
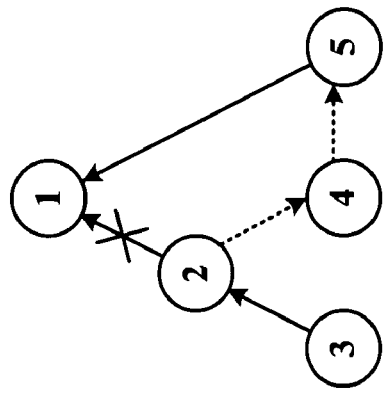
Figure 1B:
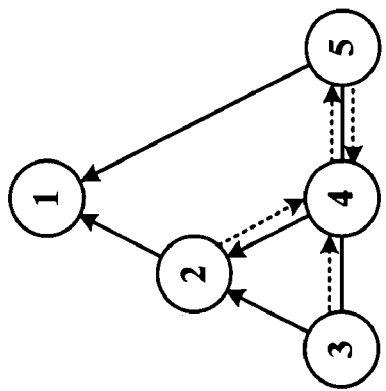
Figure 1A:
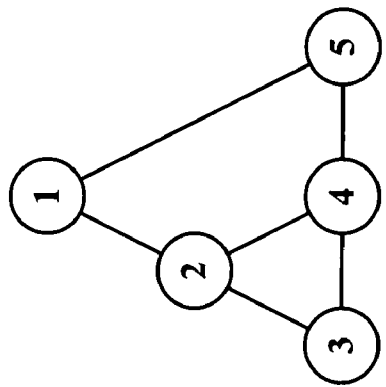

The routers are coordinated to form backup paths without dead loops. For example, the failure in FIG. 1C can be recovered only if node 2 and node 4 use their backup ports and node 5 keeps using its primary port. In at least some embodiments consistent with the present invention, a 9-bit recovery information is inserted into packets that encounter failures. This inserted recovery information helps to make correct port selections.

Before a mathematical formulation is presented, certain assumptions are made. First the topology is assumed to be a "Survivable Topology". A network topology is said to be survivable to double link failures if all the nodes remain connected after the failed links are removed. It is always assumed that the network topology is survivable since it is impractical to achieve failure recovery otherwise. Further, within an autonomous system (AS), all the primary paths to each particular node form a forwarding tree. Without loss of generality, node 1 is selected as the destination in the following description unless another node is explicitly specified as the destination. It is further assumed that each link is bidirectional, but the costs along the two directions could be different. No restrictions on the primary paths are introduced, which can be assigned in any manner, including determined using either shortest or non-shortest path algorithms.

In normal operation, the primary paths to node 1 form a spanning tree of the topology. When a failure occurs, a subset of the nodes switch to their backup ports for fast rerouting, and the set of forwarding paths are changed accordingly. The rerouting is correct if and only if the new set of forwarding paths still form a spanning tree with node 1 as the root. Based on this observation, the present inventors have formulated the problem of an IPFRR scheme that handles double-link failure (with node 1 as the destination) as the following integer linear programming (ILP) problem. The notations are defined in Table 1.

TABLE 1

| | |
|---|---|
| (V, E): | A network with node set V and link set E. |
| $e_{i,j}$: | Binary, $e_{i,j} = 1$ means a link exists from i to j. |
| N: | The number of nodes in the network: $N = |V|$. |
| $p_n$: | The primary port of node n, the value of $p_n$ is the index of the node the port points to. |
| $b_n$: | The backup port of node n, the value of $b_n$ is the index of the node the port points to. |
| $a_n^{x,y;u,v}$: | Binary $a_n^{x,y;u,v} = 1$ indicates port $p_n$ is selected by node n when link x-y and u-v fail. |
| $\beta_n^{x,y;u,v}$: | Binary $\beta_n^{x,y;u,v} = 1$ indicates port $b_n$ is selected by node n when link x-y and u-v fail. |
| $\hat{b}_n$: | The secondary backup port of node n, the value of $\hat{b}_n$ is the index of the node the port points to. |
| $\gamma_n^{x,y;u,v}$: | Binary $\gamma_n^{x,y;u,v} = 1$ indicates port $\hat{b}_n$ is selected by node n when link x-y and u-v fail. |
| $t_n^{x,y;u,v}(n)$: | Binary $t_n^{x,y;u,v}(n) = 1$ indicates the traffic from node n to node 1 takes link i-j when link x-y and u-v fail. |

Given:

A network (V,E) and the primary port of each node $p_n$ (n=2, . . . , N).

Minimize:

$$\sum_{x,y;u,v \in V} \left( \sum_{n \in V} \left( \sum_{i,j \in V} t_{i,j}^{x,y;u,v}(n) \right) \right) \quad (1)$$

Subject To:

$$\sum_{m \in V} t_{i,m}^{x,y;u,v}(n) - \sum_{k \in V} t_{k,i}^{x,y;u,v}(n) = \begin{cases} 1 \to \text{if } i = n \\ -1 \to \text{if } i = 1 \\ 0 \to \text{otherwise} \end{cases} \quad (2)$$

$$\left( \sum_{n=2}^{N} t_{i,m}^{x,y;u,v}(n) \right) \left( \sum_{n=2}^{N} t_{i,k}^{x,y;u,v}(n) \right) = 0, \, m \neq k; k \in V \quad (3)$$

$$t_{i,j}^{x,y;u,v}(1) = 0 \quad (4)$$

$$t_{x,y}^{x,y;u,v}(n) = t_{u,v}^{x,y;u,v}(n) = 0 \quad (5)$$

$$t_{i,j}^{x,y;u,v}(n) \leq e_{i,j} \quad (6)$$

$$p_n^{x,y;u,v} = p_n \alpha_n^{x,y;u,v} + b_n \beta_n^{x,y;u,v} + \hat{b}_n \gamma_n^{x,y;u,v} \quad (7)$$

$$\alpha_n^{x,y;u,v} + \beta_n^{x,y;u,v} + \gamma_n^{x,y;u,v} = 1 \quad (8)$$

$$t_{n,p_n^{x,y;u,v}}^{x,y;u,v}(n) = 1 \quad (9)$$

$$t_{i,j}^{x,y;u,v}(n), \alpha_n^{x,y;u,v}, \beta_n^{x,y;u,v}, \gamma_n^{x,y;u,v} \in \{0, 1\} \quad (10)$$

$$b_n, \hat{b}_n \in V \quad (11)$$

where variables in (2)-(11): •x,y,u,v,i,j,n∈V; n≠1.

The forgoing formulation is now explained. The objective function (1) is chosen to minimize the aggregated length of the forwarding paths under all kinds of failure patterns. Constraint (2) guarantees that each node has a continuous forwarding path to node 1. Equation (3) means that each node has no more than one parent. This constraint and constraint (2) guarantee that the forwarding paths under each failure pattern form a spanning tree. For example, suppose node i chooses m as the next hop when link x-y and u-v fail, there must be $$\sum_{n=2}^{N} t_{i,m}^{x,y;u,v}(n) > 0.$$

For any other node k (k≠m), it does not have traffic coming from node i, which means $$\sum_{n=2}^{N} t_{i,m}^{x,y;u,v}(n) = 0.$$

Equation (4) means node 1 generates no traffic. Constraints (5) and (6) mean that traffic is carried only by those links that experience no failure. Equations (7) and (8) ensure that each node uses either its primary port or one of its backup ports. Finally, equation (9) means that port $p_n^{x,y;u,v}$ is always used to forward the traffic from node n to node 1.

Solving the ILP yields two set of variables:

Ports: the backup ports of node n: $b_n$, and $\hat{b}_n$;

Configurations: the port selection of node n when link x-y and u-v fail: $\alpha_n^{x,y;u,v}$, $\beta_n^{x,y;u,v}$ and $\gamma_n^{x,y;u,v}$.

However, the calculation is very complex, especially when the size of the network is large. On the other hand, it is not clear if the port selection during recovery can be done without failure advertising since α, β and γ are based on failure locations. Therefore, at least some embodiments consistent with the present invention used a practical heuristic algorithm, described below.

First the principles of the present invention using single-link failure are presented. Then, double-link failures are classified into several patterns and schemes, consistent with the present invention, for each pattern are explained. After that, the details of the algorithm and forwarding policy are presented. The notations being used are:

| | |
|---|---|
| T(n) | A tree with node n as the root |
| x → ... → z | A path from node x to node z |
| P(n) | The primary path from node n to node 1 |
| P.start | The start of path P. If P = x → y → z, then P.start = x |
| P.end | The end of path P |
| $P_a \cap P_b$ | The overlapped path between path $P_a$ and $P_b$, if the two paths have the same source node, we define the source node is not included in $P_a \cap P_b$ |
| L(n) | The level of node n in the primary tree T(1), which is defined as the hop count from node n to node 1 in T(1) |

Figure 4B:
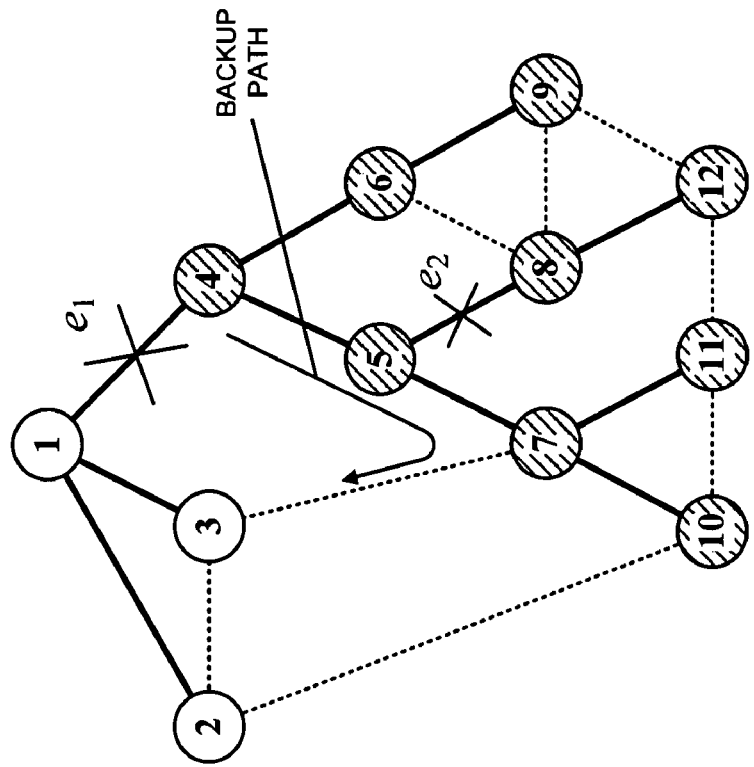
FIGS. 4A-4F illustrate six possible double-link failure patterns that may occur in an IP network.
Figure 4A:
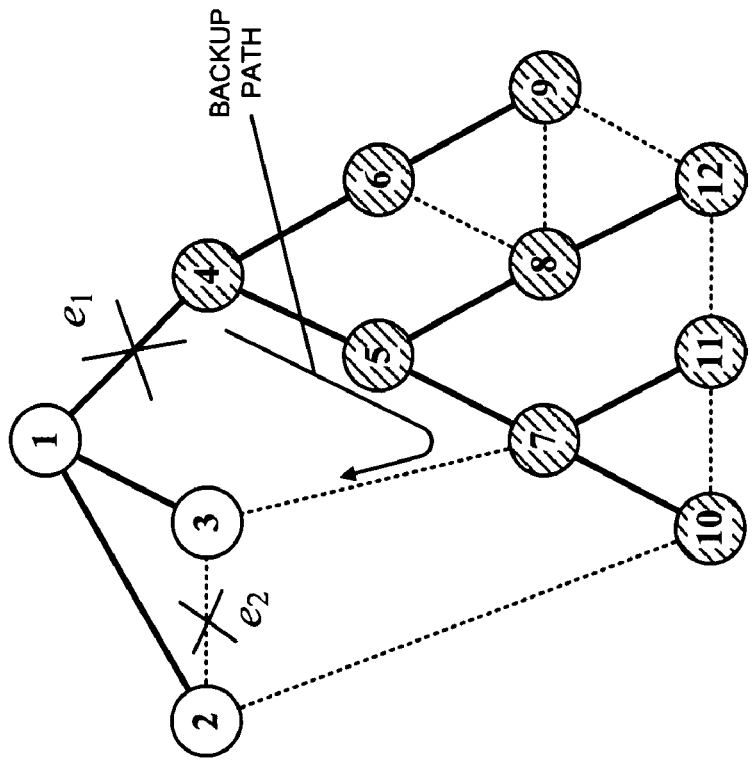

An example illustrating operations consistent with the present invention is presented using FIG. 4A. Suppose there is only one failure, $e_1$. The failure disconnects sub-tree T(4) from the primary tree. We "dye" T(4) black and T(1)\T(4) white. The key is to find a directed link to reconnect the black part to the white part. The link and its start are called the "exit link" and its node is called "exit node" of the black sub-tree. In general, the exit link and exit node of sub-tree T(W) are denoted as $x_W$ and $X_W$, respectively.

For a single-link failure, a method consistent with the present invention scans the black sub-tree in breadth-first order to find the first node that links to a white node, which is an exit node. In FIG. 4A, we find $X_4$=7 and the exit link becomes $x_4$=7→3. The backup ports of the related nodes are set as $b_4$=5, $b_5$=7, and $b_7$=3. It shows that the backup path follows the reverse direction of the primary path until it goes out of the black sub-tree. With this characteristic, the port selection becomes very simple: a router uses its backup port only if the primary port fails or the packet comes in from its parent node. The details of methods for single-link failure recovery can be found in the applicants previous work (See, e.g., K. Xi and H. J. Chao, "IP Fast Rerouting for Single Link/Node Failure Recovery," *Polytechnic Univ. Technical Report*, (2006); U.S. patent application Ser. No. 11/786,417 (incorporated herein by reference), titled "DETERMINING REROUTING INFORMATION FOR SINGLE-LINK FAILURE RECOVERY IN AN INTERNET PROTOCOL NETWORK," filed on Apr. 10, 2007, and listing Hung-Hsiang Jonathan CHAO and Kang XI as inventors; and U.S. patent application Ser. No. 11/786,416 (incorporated herein by reference), titled "DETERMINING REROUTING INFORMATION FOR SINGLE-NODE FAILURE RECOVERY IN AN INTERNET PROTOCOL NETWORK," filed on Apr. 10, 2007, and listing Hung-Hsiang Jonathan CHAO and Kang XI as inventors.)

Recovery from double-link failures is more complicated and extends single-link recovery techniques. Such recovery is described below using the following definitions:

Failure Distance: Given a sub-tree T(W) created by a link failure, the failure distance from each node n(n∈T(W)) to the failed link is defined as L(n)-L(W). In FIG. 4A, the failure distances from node 4, 5, 7 to $e_1$ are 0, 1, and 2, respectively.

Recovery Distance: Given a backup port of node n and its backup path B(n), the merge point of B(n) and its primary path P(n) is Z=(P(n)∩B(n)).start. The recovery distance of the backup port through the given backup path is defined as the hop count from node n to node Z along the primary path: L(n)-L(Z). In FIG. 4A, P(5)=5→4→1 and B(5)=5→7→3→1, therefore, (P(5)∩B(5)).start=1., and the recovery distance of the backup port of node 5 using the backup path is L(5)-L(1)=2

Dependent: Given two mutual exclusive sub-trees T(W) and T(Z), when the primary port of Z fails, if all possible paths from node Z to node 1 have to traverse T(W), T(Z) is defined as a dependent of T(W). In FIG. 4A, T(6) is a dependent of T(8) since it cannot reach node 1 without T(8) when link 6-4 fails.

Embodiments consistent with the present invention may operate to:
  Find two exits for each sub-tree to handle double-link failures.
  Find two backup ports for each node.
  Calculate the recovery distance of each backup port based on the backup path it leads to.
  When a packet sees a failure, a counter is set to indicate the failure distance, which is updated in subsequent routers. (In FIG. 4A, if a packet sees $e_1$ at node 4, its counter is set to 1 when being sent to node 5, and node 5 increases the counter to 2 before forwarding the packet to node 7.)
  To achieve failure recovery in at least some embodiments consistent with the present invention, a router selects the backup port whose recovery distance is greater than then failure distance. For example, in FIG. 4A, node 5 can use the illustrated backup path to bypass $e_1$ because the recovery distance is greater than the failure distance.

§4.2.1 Failure Pattern Analysis

This section describes double-link failure patterns that may occur in an IP network. Specifically, Table II provided below and FIGS. 4A-4F illustrate all the classifications of double-link failure patterns. Given two link failures $e_1$ and $e_2$, if $e_1 \notin T(1)$ and $e_2 \notin T(1)$, they do not affect the primary paths and are not considered in the analysis. Otherwise, it is assumed that $e_1$ creates a black sub-tree T(W) and find a backup path B(n) for node W to bypass failure $e_1$. Without loss of generality, the backup path from node W is only considered, and the failures based on the relationship between $e_2$ and $e_1$ in Table II are classified; examples of the patterns are shown in FIGS. 4A-4F. The combinations of the six patterns cover all possible double-link failures that affect the primary paths.

TABLE II

| | $e_2 \notin T(1)$ | | $e_2 \in T(1)$ | |
|---|---|---|---|---|
| $e_2 \notin T(1)$ | | | $e_2 \in T(W)$ | |
| $e_2 \notin B(W)$ | $e_2 \in B(W)$ | $e_2 \notin B(W)$ | $e_2 \in B(W)$ | $e_2 \notin B(W)$ | $e_2 \in B(W)$ |
| Pattern 1 | Pattern 4 | Pattern 3 | Pattern 5 | Pattern 2 | Pattern 6 |

Figure 4D:
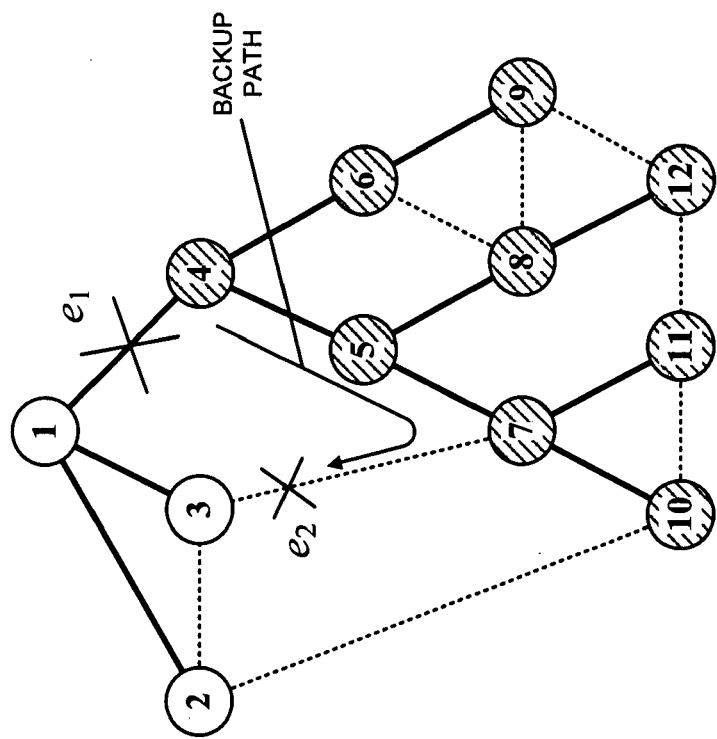
Figure 4C:
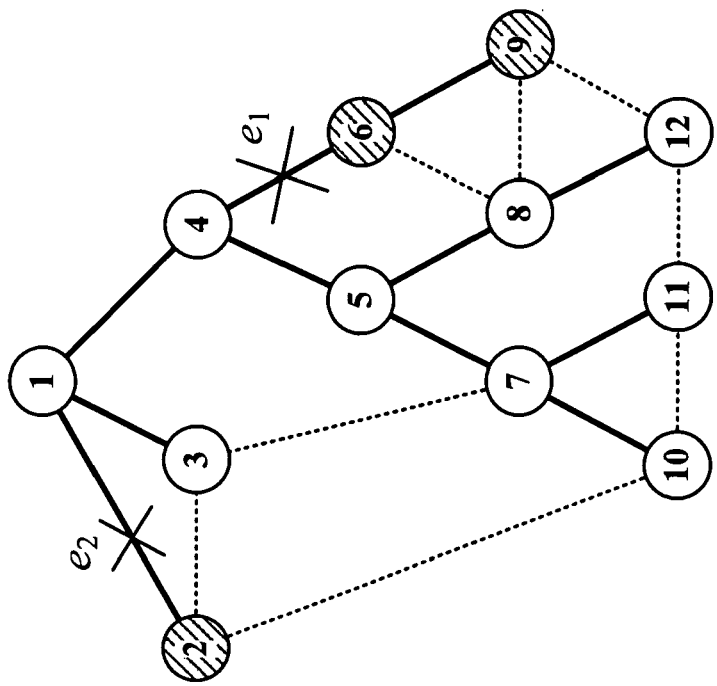

The classified failure patterns include:

Pattern 1, 2 and 3: Since $e_2$ does not affect B(W), the backup path can be used to bypass $e_1$ successfully, as shown in the examples illustrated by FIGS. 4A-4C. In FIG. 4A, failure $e_1$ creates the black sub-tree T(4) and failure $e_2$ between link 2-3 does not affect the backup path B(4)=4→5→7→3→1. Hence, packets sent/forwarded by node 4 may use the backup path to bypass $e_1$ successfully and reach the destination node 1. In FIG. 4B, failure $e_1$ creates the black sub-tree T(4) and failure $e_2$ within the black sub-tree T(4) between primary link 8-5 does not affect the backup path B(4)=4→5→7→3→1. Hence packets sent/forwarded by node 4 may use the backup path to bypass $e_1$ successfully and reach the destination node 1. In FIG. 4C, failure $e_1$ creates the black sub-tree T(6) and failure $e_2$ creates another black sub-tree T(2), however failure $e_2$ does not affect the backup path B(6)=6→8→5→4→1 (not shown in FIG. 4C). Hence packets sent/forwarded by node 6 may use the backup path to bypass $e_1$ successfully and reach the destination node 1.

Pattern 4: Since $e_2 \notin T(1)$ and $e_2 \in B(W)$, the failure must be on the exit link of T(W). Therefore, we find another exit for T(W), which is not affected by $e_2$. In FIG. 4D, failure $e_1$ creates the black sub-tree T(4) and failure $e_2$ between link 7-3 affects the first backup path B(4)=4→5→7→3→1 used in FIGS. 4A-4B. Hence, packets sent/forwarded by node 4 may use the secondary backup path B^(4)=4→5→7→10→2→1 to bypass $e_1$ and $e_2$ successfully and reach the destination node 1.

Figure 4F:
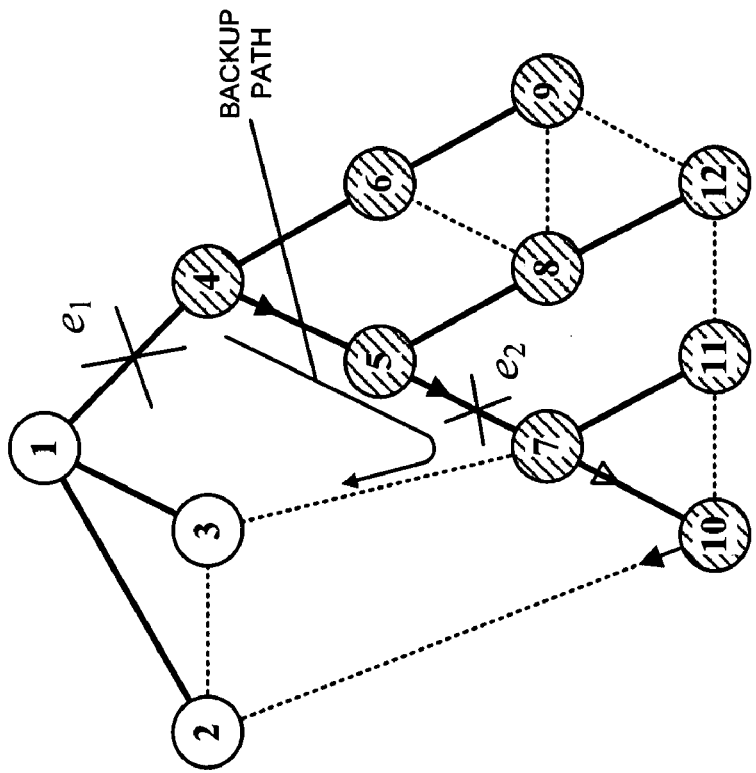
Figure 4E:
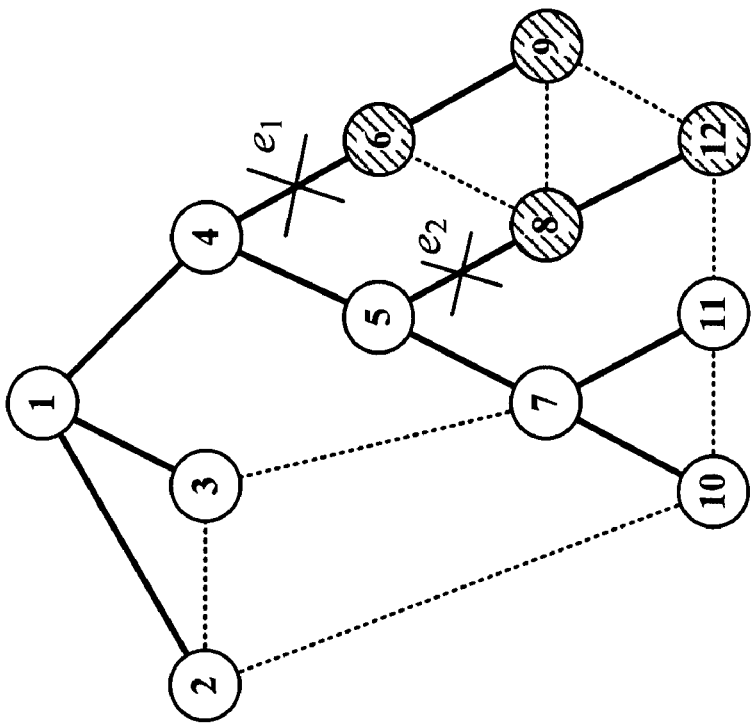

Pattern 5: $e_1$ and $e_2$ create two black sub-trees. The key is to avoid dead loops between them. In FIG. 4E, T(6) is a dependent of T(8) because all its exits go to T(8). Therefore, T(8) must have at least one exit that does not go back to T(6), which is 8→12→11. As a result, packets forwarded from the sub-trees T(6) and T(8) may use the exit link 12→11 to bypass $e_1$ and $e_2$ successfully and reach the destination node 1.

Pattern 6: $e_2$ creates a sub-tree T(Y) inside T(W). In FIG. 4F, W=4 and Y=7. The recovery of T(Y) is straightforward because following part of B(W) can bypass both failures. For example, 7→3→1. So the key problem is the recovery of T(W)\T(Y). The solution is: first step, find a backup path for T(W)\T(Y) that does not traverse T(Y); second step, if such a path does not exist, find a path that can enter T(Y). In FIG. 4F, the second step is reached and the final backup path from node 4 is B(4)=4→5→8→12→11→7→3→1.

Figure 5:
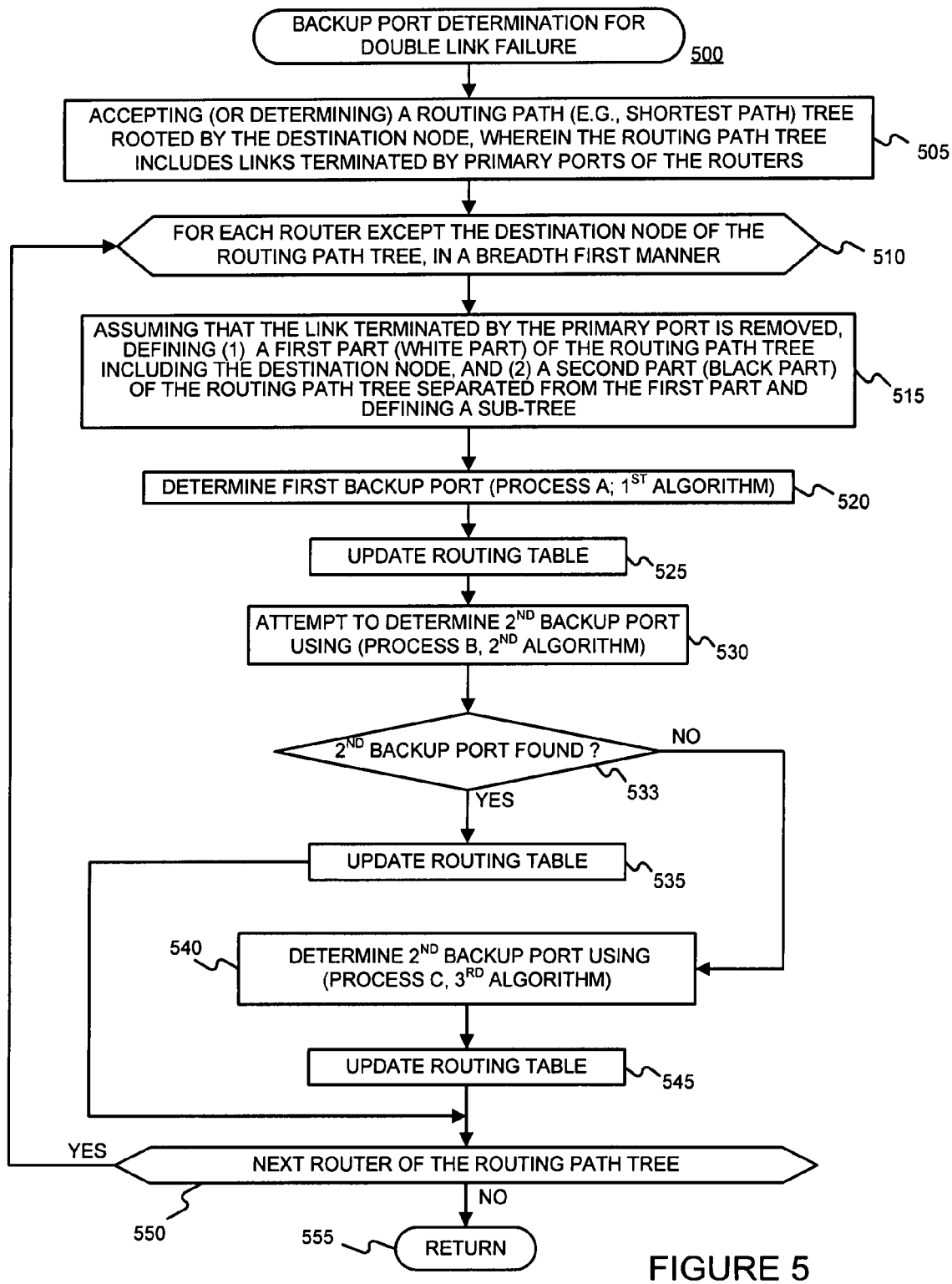
FIG. 5 is a flow diagram of an exemplary method for determining first and secondary backup ports of various nodes of an IP network (to be used for double-link failure recovery), in a manner consistent with the present invention.

§4.2.2 Exemplary Embodiment for Determining Backup Ports for Double-Link Failures FIG. 5 is a flow diagram of an exemplary method for determining first and secondary backup ports of various nodes of an IP network (to be used for double-link failure recovery), in a manner consistent with the present invention. In general, given an IP network such as that of FIG. 3A, the exemplary method scans T(1) in a breadth-first order, for each node W. Then first, second, and/or third algorithms are executed to find backup paths which cover all possible double-link failures in the IP network. These algorithms will be described in below. Each node W maintains a first backup port $b_W$ and a secondary backup port $\hat{b}_W$. The first backup port $b_W$ and the secondary backup port $\hat{b}_W$ are associated with attributes $(\hat{r}_W^1, \hat{r}_W^2, \epsilon_W, \Delta_W)$ and $(\hat{r}_W^1, \hat{r}_W^2, \hat{\epsilon}_W, \hat{\Delta}_W)$, respectively. The attributes of $b_W$ are defined below, those of $\hat{b}_W$ are defined in the same way:

$r_W^1$—The recovery distance by taking $b_W$, if the backup path spans only one exit link.

$r_W^2$—The recovery distance by taking $b_W$, if the backup path spans two exit links.

$\epsilon_W$—$\epsilon_W$=True/False indicates $b_W$ points to an exit/non-exit link.

$\Delta_W$—$\Delta_W$=L($b_W$)−L(W).

The difference between $r_W^1$ and $r_W^2$ is explained using FIG. 4A and FIG. 4B. In FIG. 4A, the backup path is 4→5→7→3→1. Thus, $r_4^1$=1, $r_5^1$=2 and $r_7^1$=3. On the other hand, the backup path in FIG. 4F takes two exit links: 4→5→8→12→11→7→3→1, which sets the two-exit attributes in node 4, 5, 8 and 12: $r_4^2$=1, $\hat{r}_5^2$=2, $r_8^2$=3 and $r_{12}^2$=4. Node 5 is different from the other nodes in that the path goes through its secondary backup port $\hat{b}_5$=8.

When $b_W$ does not point to an exit link, the value of $\Delta_W$ is always 1 because going through that port moves to a child node of W, which means the failure distance increases by one. $\Delta_W$ is used to maintain the correct failure distance when W is the first exit node of a two-exit backup path. Consider the backup path in FIG. 4F: 4→5→8→12→117→3→1. Each packet taking 12→11 updates its counter with $\Delta_{12}$=0 for correct rerouting thereafter.

The following paragraphs describe in detail the algorithms used in determining a first backup port and a second backup port for each node in an IP network. The details of first, second and third algorithms are presented in the following and use examples to show how they work. When performing breadth-first search for an exit link, the children of each node is sorted by their indexes. When an exit node has multiple exit links, the one creating the shortest backup path is chosen. If there is a draw, the exit link pointing to the node is chosen with the minimum index.

First Algorithm (Process A):

The sub-tree T(W) is dyed black and T(1)\T(W) white, then its first exit node $X_W^1$ and exit link $x_W^1$ are determined as follows:

1) If $b_W$=null, go to step 2). If $b_W$≠null, a backup path for T(W) is already found go to step (3).
2) Scan T(W) in breadth-first order and check the neighbor(s) of each node, to find the first node that links to a white node. The node and the link are $X_W^1$ and $x_W^1$, respectively. Go to step (4).
3) If $r_W^1$≠null, the first exit of T(W) is already configured, stop. Otherwise, follow the first backup ports of node W and the subsequent nodes until an exit of T(W) is reached, where the exit node and link are $X_W^1$ and $x_W^1$, respectively.
4) The primary path of W is P(W), and its backup path found in the previous step is B(W). The merge point of the two paths outside T(W) is Z=(P(W)∩B(W)).start.
5) Denote the primary path from $X_W^1$ to W as $v_1 \to v_2 \ldots \to v_K$, where $v_1=X_W^1$ and $v_K$=W. Let $v_0=x_W^1$.end and set the backup port and port attributes of $v_k$ (k=1, ..., K) as follows:

$b_{v_k}=v_{k-1}$;
$r_{v_k}^1=L(v_k)-L(Z)$;
$\epsilon_{v_k}=(k==1)?$True:False;
$\Delta_{v_k}=L(v_{k-1})-L(v_k)$;

Using T(4) in FIG. 4A as an example, the following steps are taken in accordance with the first algorithm: scan T(4) in a breadth-first order and determine a backup path 4→5→7→3→1. Therefore, the backup ports and attributes of node 4, 5 and 7 are set, respectively. The first algorithm (Process A) finds a backup path that bypasses the failure of node W's primary port. Therefore, it guarantees the recovery from all failures belonging to pattern 1, 2 and 3, where $e_1$ is on W's primary port.

Second Algorithm (Process B):

The sub-tree T(W) is dyed black and T(1)\T(W) white, then its secondary exit node $X_W^2$ and exit link $x_W^2$ are determined as follows:

1) If $\hat{b}_W$≠null, the secondary backup path of W is already found, go to step 2) to find the exit. Otherwise, go to step (3).
2) If $\hat{r}_W^1$≠null, the secondary exit of T(W) is already configured, stop and exit. Otherwise, take $\hat{b}_W$ and follow the first backup port of each subsequent node recursively until an exit of T(W) is found. Denote the exit node and link as $X_W^2$ and $x_W^2$, respectively. Go to step (4).
3) Denote the partial first backup path from W to $X_W^1$ as $w_1 \to w_2 \ldots \to w_H$, where $w_1$=W and $w_H=X_W^1$. Let $w_{H+1}$=null, from h=1 to H, assume link $w_h-w_{h+1}$ fails, scan $T(w_h)\backslash T(W_{h+1})$ in breadth-first order and check the neighbor(s) of each node to find the first node U that links to a white node through link u. Set $X_W^2$=U and $x_W^2$=u if U and u satisfy:

u is different from T(W)'s first exit link: u≠$x_W^1$;

Find the merge point of the first backup path of T(W) and the backup path from W through link u:

$$M=(B(W) \cap P(u.\text{end})).\text{start} \quad (12)$$

Since both backup paths go to T(M), u must be selected such that T(M) is not a dependent of T(W) to avoid permanent loop (Recall the definition of "dependent" in §4.2 above.).

If both the first and secondary backup paths of T(M) are already found, u must be selected such that at least one of T(M)'s backup path does not traverse T(W), that is:

$$x_M^1.\text{end} \notin T(W) \text{ or } x_M^2.\text{end} \notin T(W) \quad (13)$$

4) The merge point of the primary path and the secondary backup path from node W is:

$$Z=(P(W) \cap P(x_W^2.\text{end})).\text{start} \quad (14)$$

and the merge point of the primary paths from the two exit nodes is:

$$Y=(P(X_W^1) \cap P(X_W^2)).\text{start} \quad (15)$$

Denote the path from $X_W^2$ to Y as $v_1 \to v_2 \ldots \to v_K$, where $v_1=X_W^2$ and $v_K$=Y. Let $v_0=x_W^2$.send and set the first backup port of each $v_k$ (k=1, ..., K) as follows:

$b_{v_k}=v_{k-1}$;
$r_{v_k}^1=L(v_k)-L(Z)$;
$\epsilon_{v_k}=(k=1)?$True:False;
$\Delta_{v_k}=L(v_{k-1})-L(v_k)$;

Finally, set the secondary backup port of Y:

$\hat{b}_Y=v_{K-1}$;
$\hat{r}_Y^1=L(Y)-L(Z)$;
$\hat{\epsilon}_Y=(Y=X_W^2)?$True:False;
$\hat{\Delta}_Y=L(v_{k-1})-L(Y)$;

For pattern 4, the second failure disconnects the first exit link. Since the second algorithm (process B) ensures the secondary exit link to be different from the first one, pattern 4 failures are always recovered. In FIG. 4D, the second algorithm scans T(4)\T(5), T(5)\T(7), and T(7) in turn to find the secondary backup path 4→5→7→10→2→1, which bypasses both failures.

For pattern 5, the second algorithm ensures that two sub-trees do not point all their exit links to each other, thus avoiding dead loops and covering all such failures. Consider T(8) in FIG. 4E, if its first exit is 8→6, the second algorithm ensures the secondary exit is 8→12→11. The second algorithm avoids selecting 8→9, which leads to a dead loop because T(6) is a dependent of T(8).

For pattern 6, if step (3) finds an exit when h=1, it means all possible failures on the first backup path can be recovered using the secondary backup path. In FIG. 4F, assume $e_1$ is on link 4→5 and consider T(5). The second algorithm scans T(5)\T(7) and finds a backup path 5→8→6→4→1, which bypasses both failures.

On the other hand, if step (3) stops when h>1, the failures between $w_1$ and $w_h$ cannot be recovered because the black sub-tree between the two failures does not have white neighbors. In FIG. 4F, T(4)\T(7) does not have a white neighbor, thus the failures cannot be handled using the second algorithm. The third algorithm (Process C) is used to solve such a problem.

Third Algorithm (Process C):

The sub-tree T(W) is dyed black and T(1)\T(W) white, then study a subset of pattern 6 where the second failure creates a sub-tree T* within T(W) and the backup path from W must traverse T*. Such is the case in FIG. 4F. Different from the first algorithm and the second algorithm 2, each backup path found using the third algorithm always spans two exit links and is called two-exit path.

If $b_W \neq$ null, node W already has a secondary backup port, which means pattern 6 is fully covered and thereafter algorithm 3 (Process C) stops. Otherwise, use node Y in (15) and denote the primary path from Y to W as $w_1 \to w_2 \to \ldots \to w_H$, where $w_1 = Y$ and $w_H = W$. Let h=2, 1) Assume link $w_h$-$w_{h-1}$ fails, dye T($w_{h-1}$) white because it can use the first exit link of T(W) to forward packets. Then T($w_h$)\T($w_{h-1}$) is scanned in breadth-first order and the neighbor(s) of each node are checked to find the first node U that links to a white node through link u. In this case, the white node certainly belong to T($w_{h-1}$). If such a node exists, the two-exit backup path is found: starting from node W, the backup path first goes to U, then takes link u to T($w_{h-1}$), from which it goes through $x_W^1$ and finally reaches node 1. If the scan ends with no hit, let h=h+1 and repeat this step.

2) Find the merge point of the primary paths from U and Y:Z=P(U)∩P(Y). Denote the path from U to Z as $v_1 \to v_2 \ldots \to v_K$, where $v_1$=U and $v_K$=Z. Let $v_0$=u.end and configure the first backup port of $v_k$ (k=1, ..., K) as follows:

$b_{v_k} = v_{k-1}$;
$r_{v_k}^1 = L(v_k) - L(Z)$;
$\epsilon_{v_k} = (k=1)?True:False$;
$\Delta_{v_k} = L(v_{k-1}) - L(v_k)$;

Then configure the secondary backup port of node Z:

$b_Z = v_{K-1}$;
$\hat{r}_Z^2 = L(Z) - L(X_W^1) + r_{X_1}^1$;
$\epsilon_Z = (Z=U)?True:False$;
$\hat{\Delta}_Z = L(v_{k-1}) - L(Z)$;

If Z W, stop. Otherwise, let h=h+1, if h≦H, go back to the previous step.

The third algorithm is demonstrated using T(4) in FIG. 4F. The first round scans T(5)\T(7) and finds 4→5→8→12→11→17→3→1, which recovers failures at links 1-4 and 5-7. The second round scans T(4)\T(5) and finds 4→6→8→5→7→3→1, which handles link failures 1-4 and 4-5.

§4.2.3 General Method

FIG. 5 is a flow diagram of an exemplary method 500 for determining first and secondary backup ports for a number of nodes in an IP network for use in recovering from a double link failure, in a manner consistent with the present invention. As shown, the method 500 may accept (or determine) a routing path (e.g., shortest path) tree rooted by the destination node, wherein the routing path tree includes links terminated by primary ports of the routers. (Block 505) As indicated by loop 510-550, a number of acts may be performed for each router except the destination node (router) of the routing path tree, in a breadth first manner. Specifically, assuming that the link terminated by the primary port is removed, the method 500 may define (1) a first part of the routing path tree including the destination node (referred to as "the white part") and (2) a second part of the routing path tree separated from the first part and defining a sub-tree (referred to as "the black part"). (Block 515)

Subsequently, the method 500 may proceed to determine the first backup port(s) of the node(s) using the first algorithm (Process A) and update the routing tables according to the determined first backup port(s). (Blocks 520 and 525) Once, Process A has been completed, the method 500 may attempt to determine secondary backup port(s) of the node(s) using the $2^{nd}$ algorithm (Process B). (Block 530) If the secondary backup port(s) was found using the $2^{nd}$ algorithm (Process B), then, the routing tables is updated according to the determined secondary backup port(s), and the method 500 continues to 550. (Blocks 533 and 535) If, on the other hand, the secondary backup port(s) was found using the $2^{nd}$ algorithm (Process B), then the method 500 will determine other secondary backup port(s) of the node(s) using the third algorithm (Process C) and update the routing tables according to the determined other secondary backup port(s). (Blocks 533, 540 and 545)

Subsequently, the method 500 may then move on to the next router in the routing path tree and repeat the above steps in determining backup ports. (Block 550) When the loop 510-550 has been run for each router of the routing path tree, the method 500 is left. (Node 555)

Referring to blocks 520, 530 and 540, examples of processes A, B, and C have been descried in detail above. By running processes A, B and C in an IP network, first and secondary backup ports may be determined for every node. Specifically, Process A determines first backup ports, Process B determines some or all secondary backup ports, and Process C determines any secondary backup ports which could not be determined using Process B. Therefore, all failure patterns that may occur in the network may be handled so that proper packet forwarding and the network reliability are maintained. The flow diagrams of Process A, B, and C are described below with reference to FIGS. 6-8B.

Figure 6:
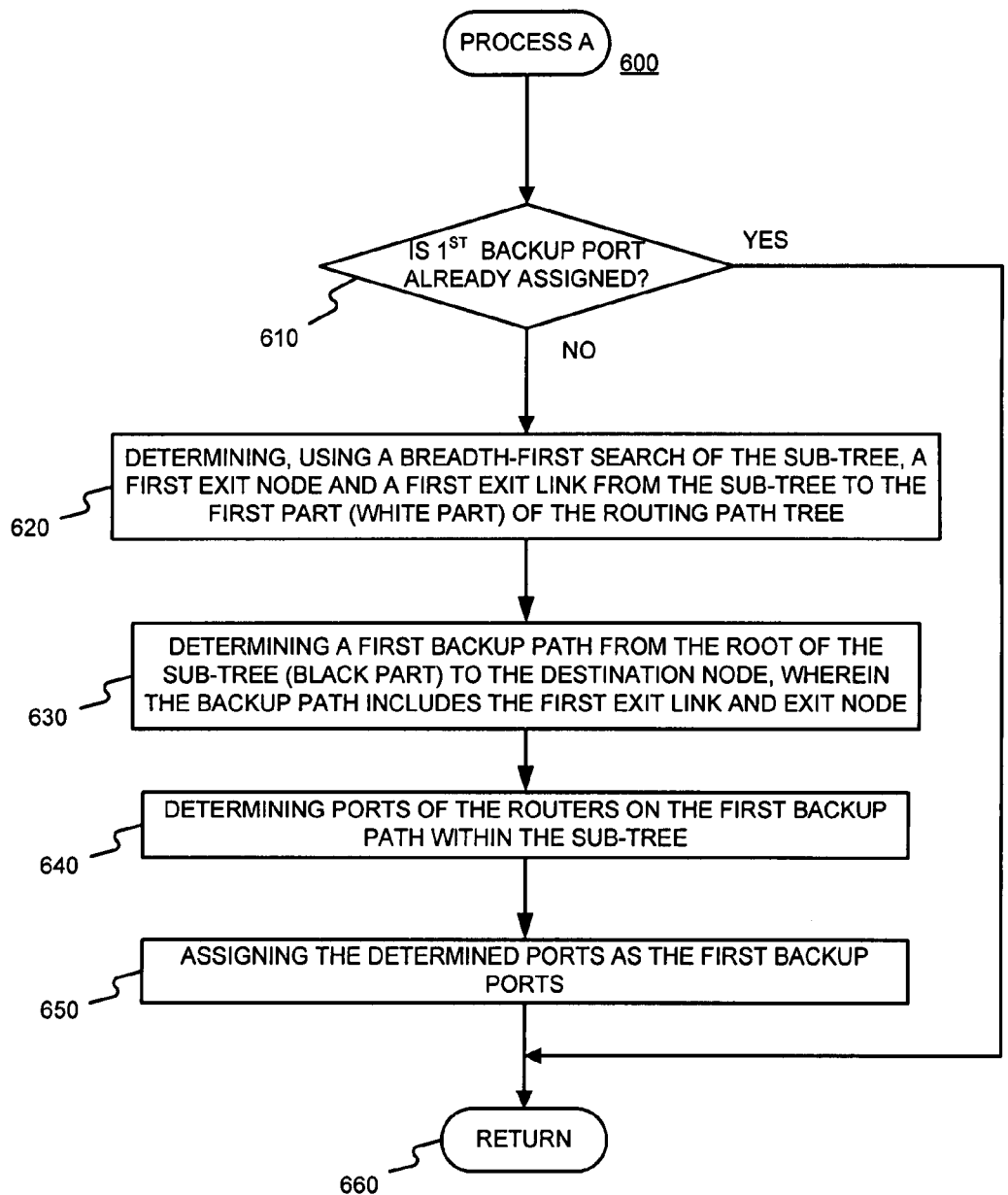
FIG. 6 is a flow diagram of an exemplary method for determining first backup ports of various nodes of an IP network for use in double-link failure recovery (from failure patterns 1, 2, and 3), in a manner consistent with the present invention.

FIG. 6 is a flow diagram of an exemplary method 600 (Process A) for determining first backup ports of various nodes of an IP network for use in double-link failure recovery (from failure patterns 1, 2, and 3), in a manner consistent with the present invention. Specifically, the method 600 may first determine if the router already has a port assigned as a first backup port. (Block 610) If it is determined that the router already has a first backup port assigned to it, the method 600 may simply return. (Node 660) On the contrary, if it is determined that the router does not have a first backup port assigned, the method 600 may proceed to determine a first backup port for the router as shown in blocks 620-650. Specifically, the method 600 may determine, using a breadth-first search of the sub-tree, a first exit node and a first exit link from the sub-tree (the black part) to the first part of the routing path tree (the white part). (Block 620) After finding a first exit node and exit link from the sub-tree (the black part) to the first part of the routing path tree (the white part), the method 600 may determine (e.g., using Dijkstra's algorithm) a first backup path from the root of the sub-tree (the black part) to the destination node, wherein the backup path includes the first the exit node and exit link. (Block 630) Next, the method 600 may determine ports of the routers on the first backup path within the sub-tree (Block 640) and assign the determined ports as the first backup ports (Block 650). Thereafter, the method 600 may then exit.

In some embodiments consistent with the present invention, the method 600 might be run at one location and the results might be signaled to the appropriate nodes.

FIG. 7, which consists of FIGS. 7A, 7B, 7C and 7D, is a flow diagram of an exemplary method 700 (Process B) for determining first backup ports that weren't determined using Process A and secondary backup ports of various nodes of an IP network for use in double-link failure recovery (from failure patterns 4, 5, and part of 6), in a manner consistent with the present invention. Specifically, the method 700 may first determine if the router already has a port assigned as a secondary backup port. (Block 702) If it is determined that the router already has a secondary backup port assigned to it, the method 700 may simply proceed to block 740 via node C. (Block 702) Referring to FIG. 7D, method 700 may check whether the recovery distance when taking the secondary backup port spanning one exit link is not zero. (Block 740) If it is determined that the recovery distance when taking the secondary backup port spanning one exit link is not zero, then the method 700 is left. (Node 742) On the contrary if the recovery distance when taking the secondary backup port spanning one exit link is zero, then the method 700 may follow the secondary backup port of the root node of the sub-tree (black part) and next follow the first backup port of each subsequent node recursively until a secondary exit link and exit node of the sub-tree (black part) is found (Block 744). The method 700 may then proceed block 730 of FIG. 7C via node B.

Figure 7A:
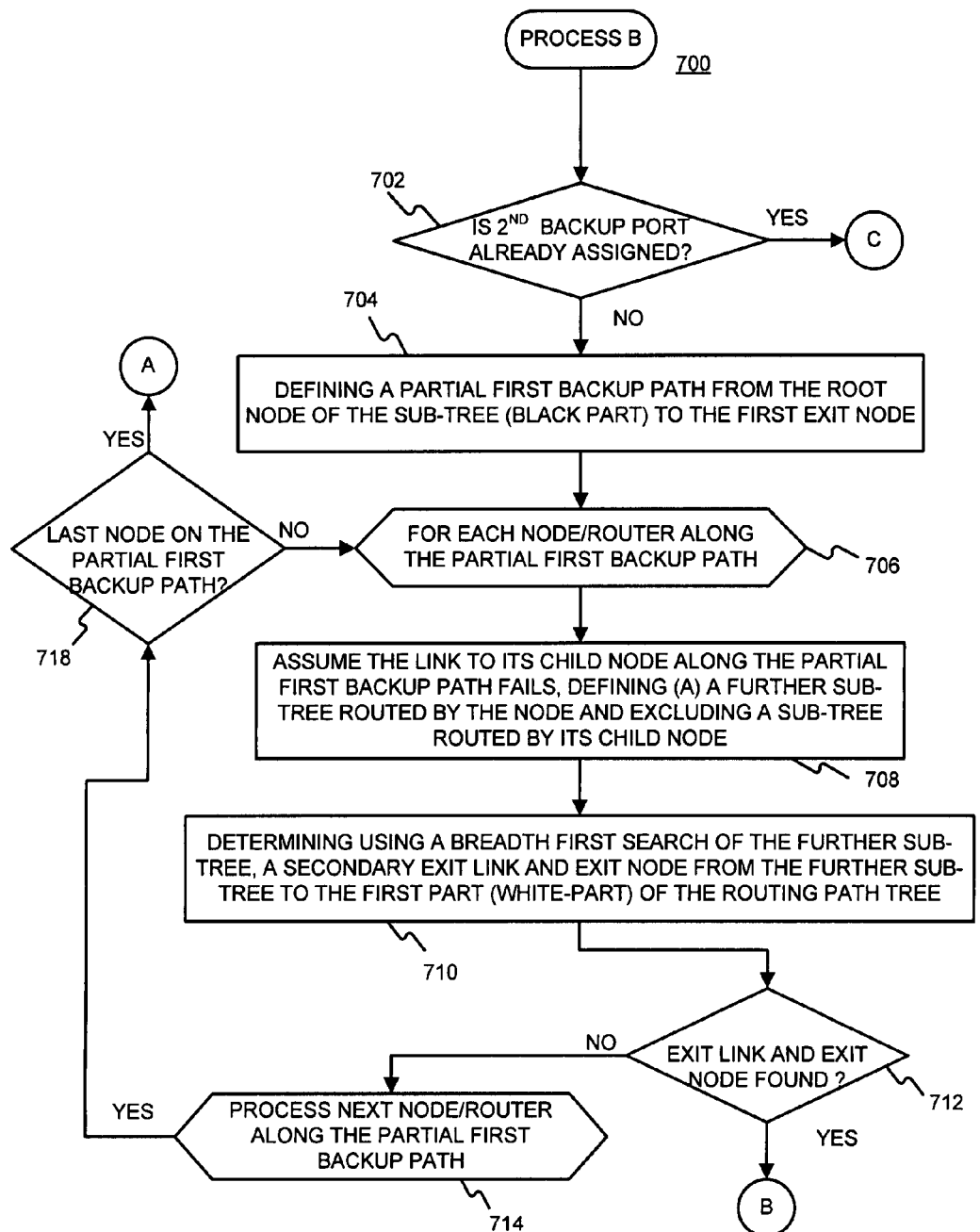

Referring back to decision block 702 of FIG. 7A, if it is determined that the router does not have a secondary backup port assigned to it, then the method 700 may proceed to determine a secondary backup port for the router as shown in the following blocks. Specifically, the method 700 may define a partial first backup path from the root node of the sub-tree (black part) to the first exit node. (Block 704) For each node/router along the partial first backup path, the method 700 may assume that the link of the node to its child node along the partial first backup path fails, defining (a) a further sub-tree rooted by the node and excluding a sub-tree routed by its child node. (Block 708) Next, the method 700 may determine, using a breadth-first search of the further sub-tree, a secondary exit link and exit node from the further sub-tree to the first part (white part) of the routing path tree. (Block 710) Thereafter, the method 700 may check if a secondary exit link and exit node has been determined. (Block 712) If a secondary exit link and exit node has not been found, the method 700 may simply proceed to process the next node/router along the partial first backup path. (Block 714)

Next, the method 700 checks whether the next selected node/router (if available) is the last on the partial first backup path. (Block 718) If the next selected node/router is not the last along the partial first backup path, then the method 700 may simply repeat the blocks in the loop 706-714. On the other hand, if the next selected node/router is the last along the first partial backup path, then the method may proceed to block 720 via node A.

Figure 7B:
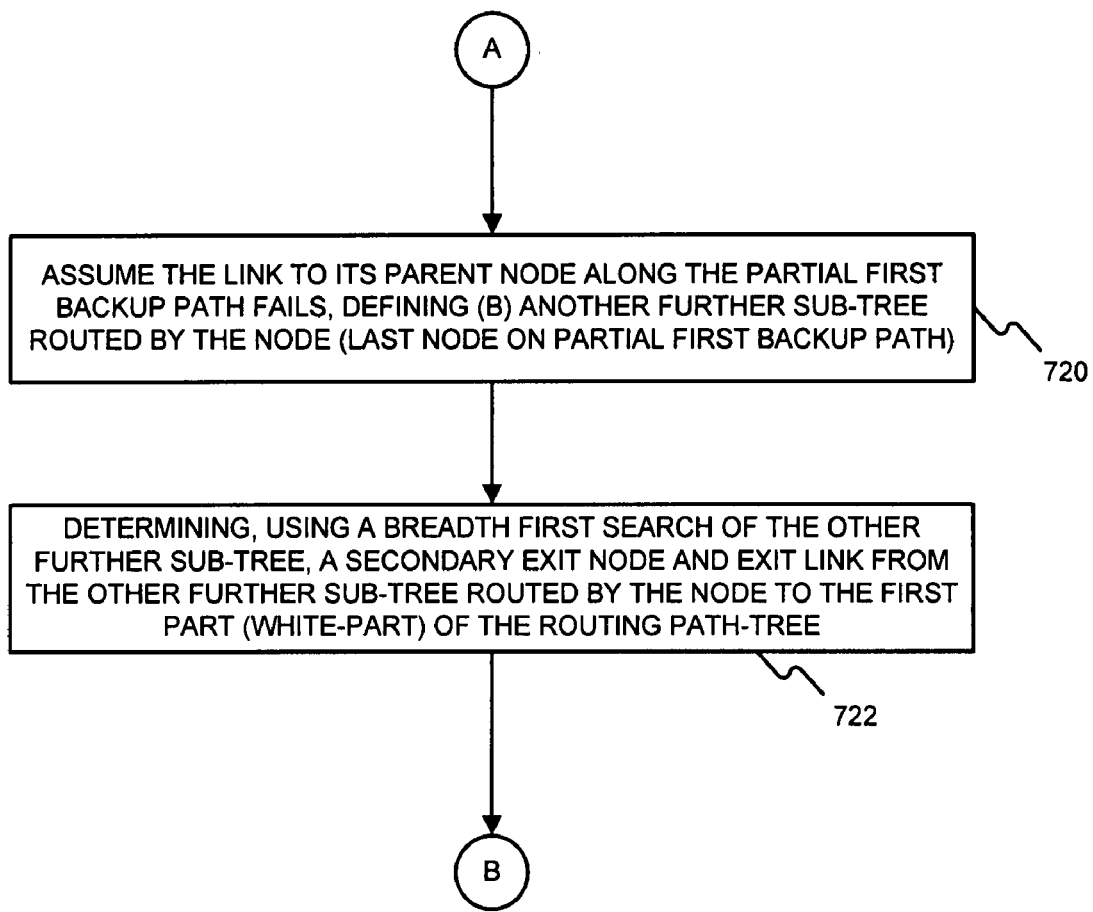

Referring to Node A of FIG. 7B, assume that the link to its parent node along the partial first backup path fails. The method 700 may define (a) another further sub-tree routed by the node (the last node on the partial first backup path). (Block 720) Next, the method 700 may determine, using a breadth-first search of the other further sub-tree, a secondary exit node and exit link from the other further sub-tree routed by the node to the first part (white part) of the routing path tree. (Block 722) The method 700 may then proceed to block 730 via node B.

Figure 7C:
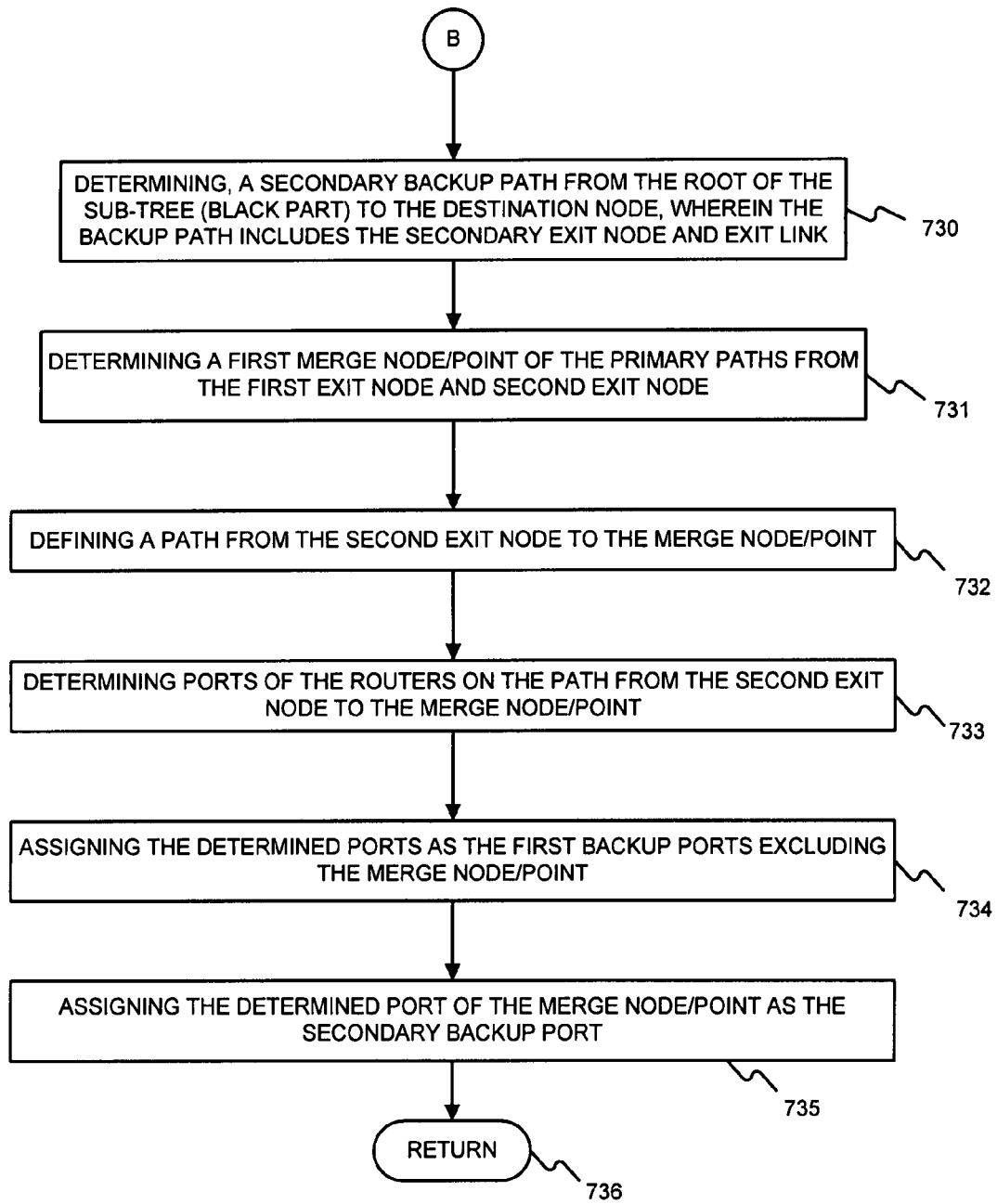
Figure 7D:
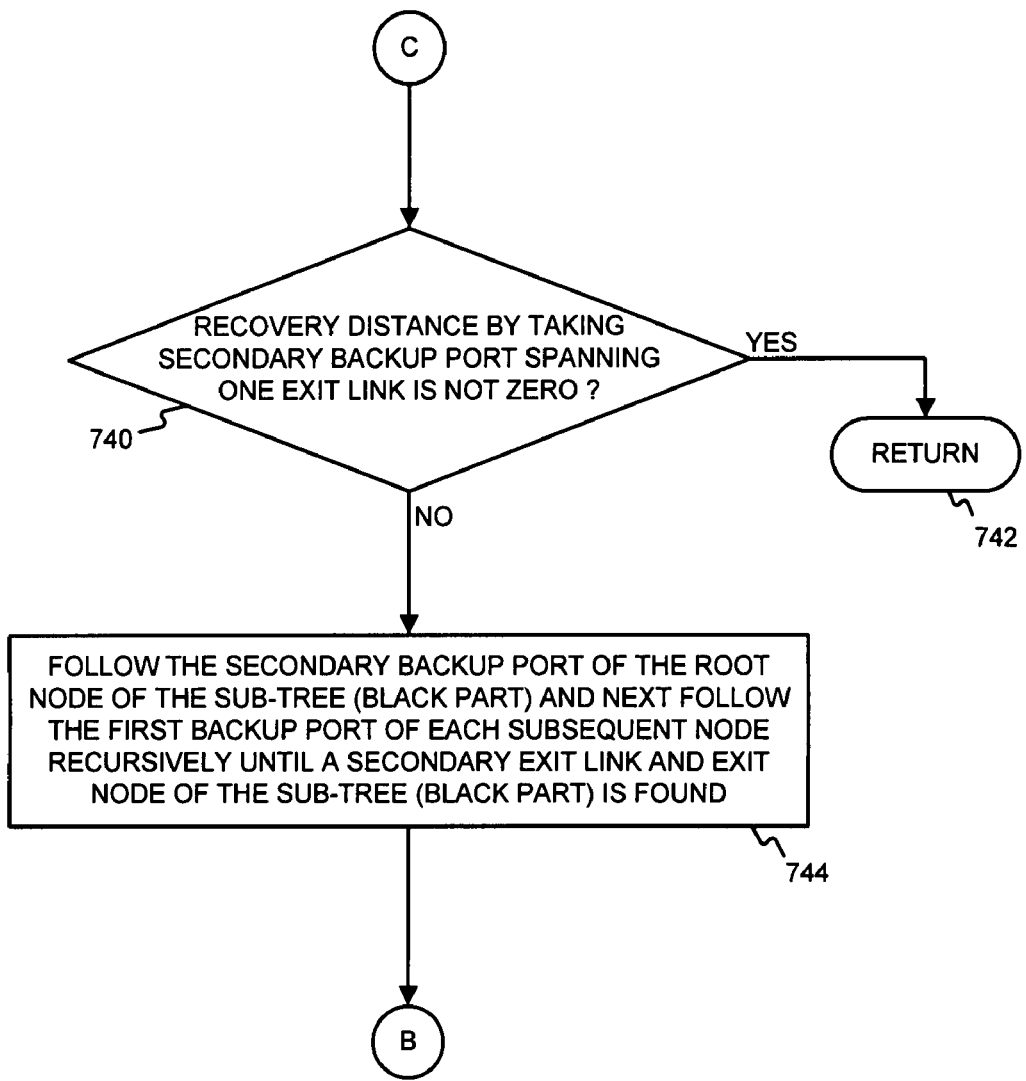

Referring to node B of FIG. 7C, the method 700 may determine a secondary backup path from the root of the sub-tree (black part) to the destination node, wherein the backup path includes the secondary exit node and exit link. (Block 730) Thereafter, the method 700 may determine a first merge node/point of the primary paths from the first exit node and second exit node and define a path from the second exit node to the merge node/point. (Blocks 731 and 732) Next, the method 700 may determine ports of the routers on the path from the second exit node to the merge node/point. (Block 733) After that, the method 700 may assign the determined ports as the first backup ports excluding the merge node/point (Block 734) and further assign the determined port of the merge node/point as the secondary backup port (Block 735), before the method 700 is left (Node 736).

In some embodiments consistent with the present invention, the method 700 might be run at one location and the results might be signaled to the appropriate nodes.

FIG. 8, which consists of FIGS. 8A and 8B, is a flow diagram of an exemplary method 800 (Process C) for determining first backup ports that weren't determined using Process A and B, and secondary backup ports that weren't determined using Process B, of various nodes of an IP network for use in double-link failure recovery (from unexplored failures in failure pattern 6), in a manner consistent with the present invention. Specifically, the method 800 may first determine if the router already has a port assigned as a secondary backup port. (Block 802) If it is determined that the router already has a secondary backup port assigned to it, then the method 800 is left. (Node 804)

On the contrary, if it is determined that the router does not have a secondary backup port assigned, the method 800 may proceed to determine a secondary backup port for the router as shown in the following blocks. Specifically, the method 800 may define a partial primary path from the merge node (determined in Process B) to the root node of the sub-tree (black part). (Block 806) For each node/router along the partial primary path, the method 800 may assume the link to the node's parent node along the partial primary paths fails, defining a further sub-tree rooted by the parent node and excluding a sub-tree rooted by the node, and redefining the first part (white part) of the routing path tree to include the excluded sub-tree rooted by the node. (Block 810)

Next, the method 800 may determine, using a breadth-first search of the further sub-tree, a further first exit node and further first exit link from the further sub-tree to the redefined first part (white part) of the routing path tree.

Thereafter, the method 800 may check whether an exit node and exit link has been found. (Block 814) If an exit node and exit link has not been found, then the method 800 may proceed to the next router/node along the partial primary path; therefore, the method 800 needs to checks if there is another router/node available on the partial primary path. (Block 814 and 816) If an available router/node is available on the partial primary path, then the method 800 may repeat the blocks of the loop 808-814. (Block 816 and node D) If no router/node is available on the partial primary path, then the method 800 is left. (Block 816 and Node 818)

Referring back to decision block 814, if an exit node and exit link have been found, then the method 800 may proceed to the acts of blocks 820-830. Specifically, the method 800, may determine a double-exit backup path from the root of the sub-tree (black part) to the destination node, wherein the double-exit backup path includes 1) the determined further first exit node and further first exit link to the redefined first part (white-part), as well as 2) the first exit node of the sub-tree (black part). (Block 820) Next, the method 800 may determine a second merge node/point of the primary path from the further first exit node and the primary path from the first merge node (Block 822) and also, define a path from the further exit node to the second merge node (Block 824). Thereafter, the method 800 may determine ports of the routers on the path from the further first exit node to the second merge node (Block 826) wherein, the method 800 may assign the determined ports as the first backup ports excluding the second merge node (Block 828), and further assign the determined port of the second merge node as the secondary backup port (Block 830). The method 800 then proceeds, via node E, to the next router/node along the partial primary path. (Block 816) Therefore, the method 800 needs to checks if there is another router/node available on the partial primary path (Block 816), already described above.

In some embodiments consistent with the present invention, the method 800 might be run at one location and the results might be signaled to the appropriate nodes.

§4.3 Using Backup Ports for Failure Recovery

This section describes exemplary embodiments for performing failure recovery in a manner consistent with the present invention. When a failure occurs, only a subset of routers needs to switch to their backup ports. Therefore, a router may need to determine when to forward packets to its first backup port, when to forward packets to its secondary backup port, and when to use the primary port. The first, second and third algorithms may find feasible backup paths. The forwarding policy described in this section selects the correct ports to ensure such paths are actually taken. Embodiments consistent with the present invention identify the pattern of the current failure(s) and then decide which port to use. To do this, each packet pk is assigned to carry the following tags in its header:

pk.f: pk.f=True indicates pk has encountered a failure.
pk.s: pk.s=0 means pattern 1/2/3, pk.s=1,2, and 3 identify pattern 4,5 and 6, respectively.
pk.c counts the number of exit link(s) pk has traversed.
pk.l indicates the failure distance (refer Definition 2).

Since the recovery of patterns 1, 2 and 3 are identical; they are not distinguishable in pk.s. Some embodiments consistent with the present invention are optimized such that pk.s and pk.c need only 3 bits in total.

FIG. 9, which consists of FIGS. 9A and 9B, is a flow diagram of an exemplary method 900 for recognizing failure patterns during the forwarding of a packet in a network, in a manner consistent with the present invention. FIG. 10, which consists of FIGS. 10A, 10B, 10C, and 10D illustrate examples of different cases of failure patterns 4, 5, and failure pattern 6 within an IP network, in a manner consistent with the present invention. With the support of FIGS. 9A-9B and FIGS. 10A-10D, an analysis is presented on how to recognize failure patters and how a packet is forwarded in the network.

In normal operation (no failure), the method 900 always forwards a packet to the primary port wherein the packets finally reaches its destination. (See Blocks 905, 910 and 940.) When it encounters a failed primary port, for instance at node W (See FIGS. 10A-10D.), for the first time, the method 900 assumes that the failure belongs to pattern 1, 2, or 3. Therefore the packet keeps using the first backup ports of each node until the failure is bypassed and the packet finally reaches the destination node or, by encountering more failures, the method 900 may assume the following patterns and forward the packet accordingly. (See Blocks 910, 915 and 920.)

Figure 10A:
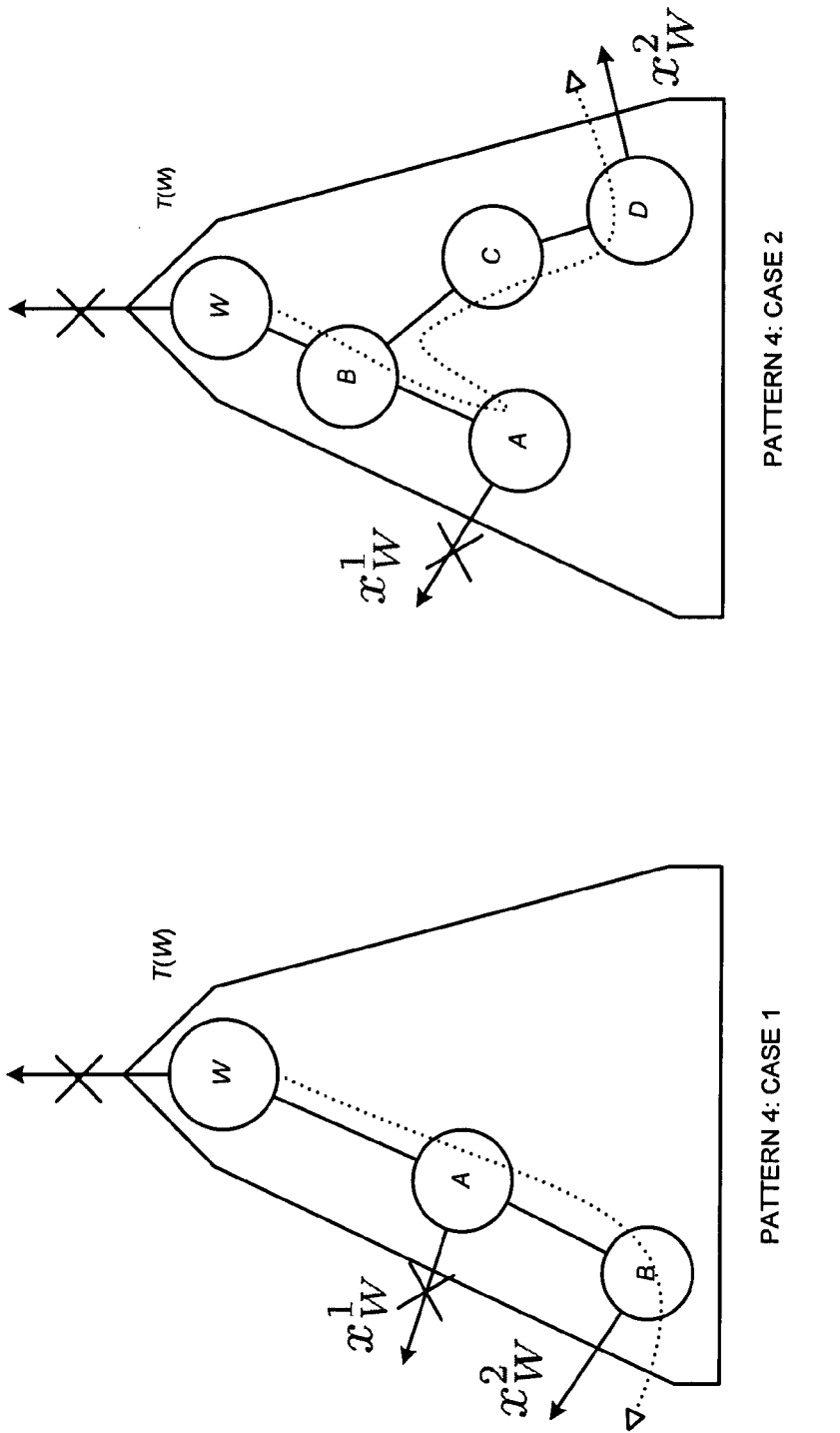

If the packet encounters a failed exit link, the method 900 may assume that a pattern 4 failure (See, e.g., FIG. 4D.) has occurred and forward the packet to the secondary backup port (exit node). (Blocks 920 and 925) As illustrated in FIG. 10A, the packet encounters a failed exit port, where the failed link must be $x_W^1$. The forwarding falls into one of the two cases shown in FIG. 10A (dotted lines depict forwarding paths). In case 1, node A's secondary backup port leads to $x_W^2$. In case, the packet goes up to find a node whose secondary backup port leads to $x_W^2$. This is done by comparing recovery distance $\hat{r}_n^1$ with the failure distance.

Figure 10B:
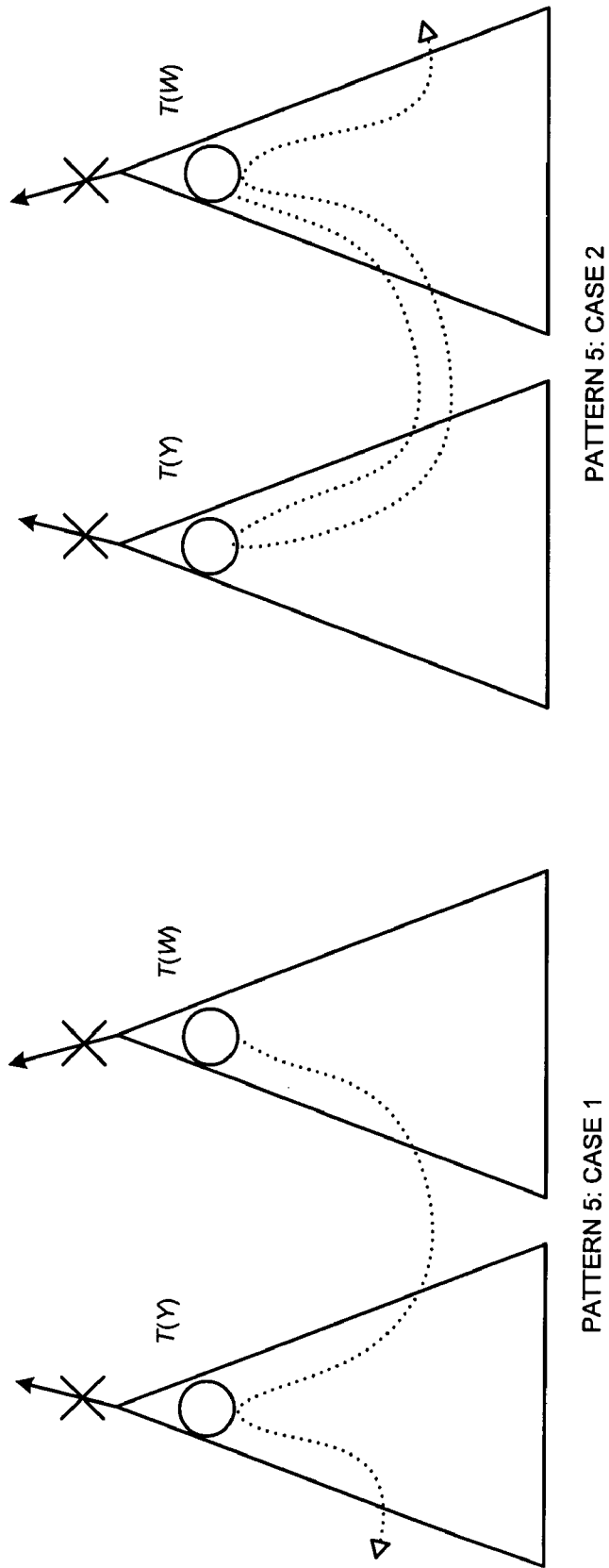
Figure 10C:
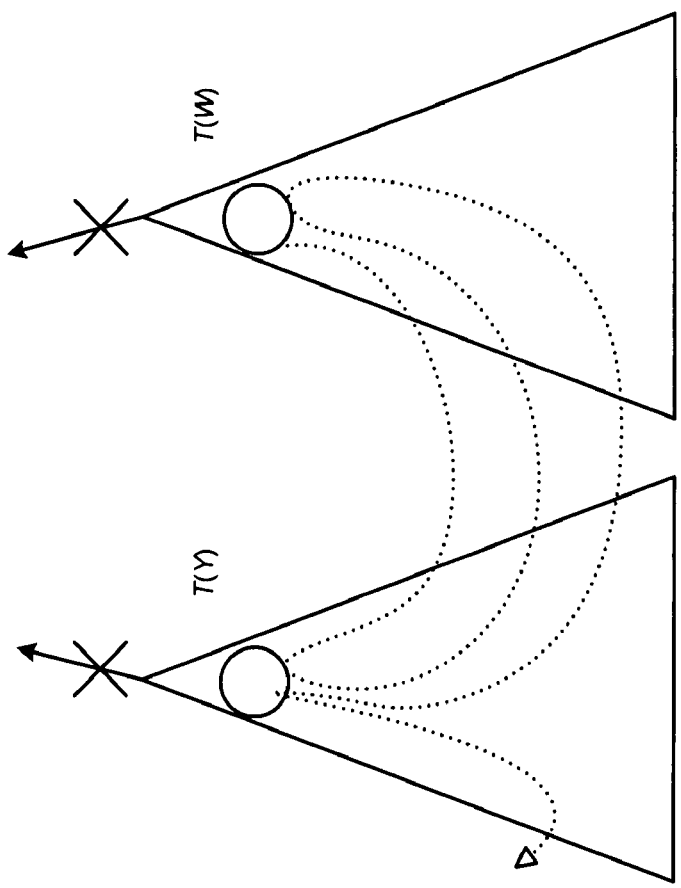

If the packet encounters another failed primary port, the method 900 may assume that a pattern 5 failure (See, e.g., FIG. 4E.) has occurred and forward the packet to the first backup port. (Blocks 920 and 930) Thereafter, the method 900 proceeds to block 945 via Node A. If the packet encounters again a failed primary port, the method 900 may forward the packet to the secondary backup port (Block 950). Otherwise if no failure occurs, the packet may continue its path toward its destination node. (Nodes B and 940) Further on, if the packet yet again encounters a failed primary port, the method 900 may forward the packet to the secondary backup port wherein, from there on, the packet may continue its path towards its destination. (Blocks 955 and 960) Otherwise, if no failure occurs the packet may again proceed towards its destination. (Nodes B and 940) As illustrated in FIGS. 10B-10C, the packet encounters another primary port failure at node Y, the packet has traversed an exit link and carries pk.c=1. Node W and Y forward the packet through their first exit links when pk.c≦1 and their secondary exit links when pk.c=2. The recovery is shown in FIGS. 10B-10C.

In case 1 (FIG. 10B), after the packet encounters a failed primary port at W, node W sends the packet through its first backup port to node Y. Thereafter, node Y may pick $x_Y^1$ (its first backup port) and the recovery is done.

In case 2 (FIG. 10B), the packet goes back to node W with pk.c=2. Node W picks $x_W^2$ (its secondary backup port) and the recovery is done.

In case 3 (FIG. 10C), the packet goes back to Y with pk.c=2. Node Y picks $x_Y^2$ and the recovery is done.

Figure 10D:
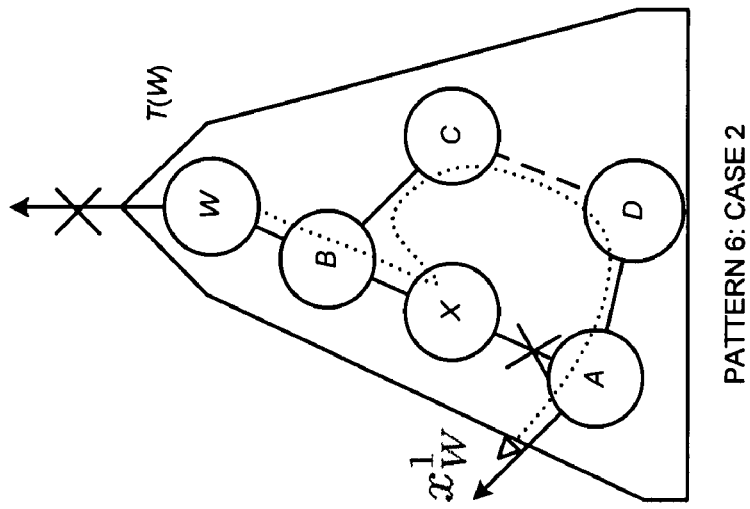
Figure 10D:
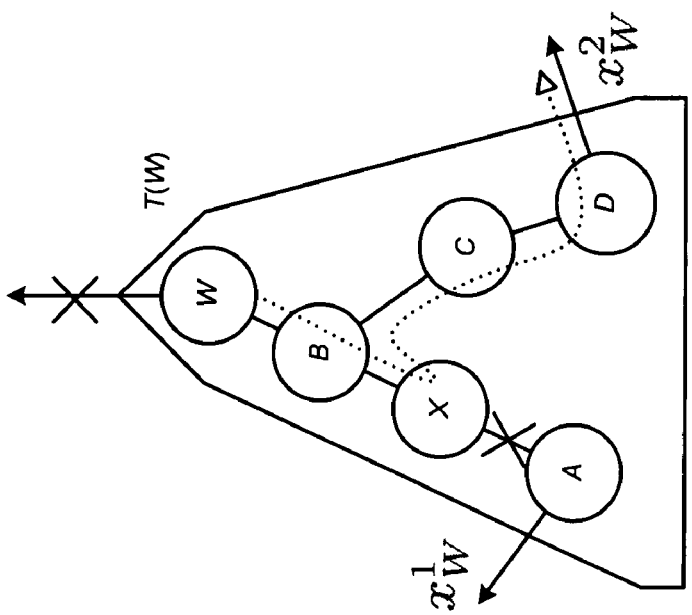

Referring back to 920 of FIG. 9, if the packet encounters a failed non-exit backup port, the method 900 may assume that a pattern 6 failure (See, e.g., FIG. 4F.) has occurred and forward the packet to the secondary backup port or a two-exit path. (Block 935) As illustrated in FIG. 10D, the packet encounters a failed non-exit backup port. In case 1, everything is the same as case of pattern 4. In case 2, the packet goes up to find a node whose secondary backup port leads to a feasible two-exit path, which is done by comparing recovery distance $\hat{r}_n^2$ with the failure distance.

After the failure pattern has been recognized, the packet may be forwarded using a forwarding policy. The flow diagrams of FIG. 11 and FIGS. 12A-12F are exemplary methods for implementing a forwarding policy in a manner consistent with the present invention. In the following description, "import port" is the port number from which the packet arrives. As will be appreciated, the packet forwarding does not involve complex operations and can be done very quickly. The tags may be updated as follows:

pk.f: Set to True when a failure is encountered, never set back to False.
pk.s: Updated when pk is blocked by a failure.
pk.c: pk.c+1→pk.c when pk spans an exit, also updated as shown in the flow diagram of FIGS. 12A-12F.

pk.l: If pk spans the exit of a one-exit path or the second exit of a two-exit path, $0 \rightarrow$ pk.l, else if pk.l>0, pk.l+$\Delta_n \rightarrow$pk.l when through $b_n$; pk.l+$\hat{\Delta}_n \rightarrow$pk.l when through $b_n$; and pk.l−1$\rightarrow$pk.l when through $p_n$.

According to the flow diagrams of FIGS. 12A-12F, there are only 6 states which may cover all failure patterns and ensures accurate forwarding port selection. Also the scheme ensures pk.c<3, so three bits are more than enough for pk.s and pk.c. A possible configuration is to represent state 1, 2, . . . , 6 with (pk.s, pk.c)=(0,0),(0,3),(0,1),(0,2),(1,0),(1,1), respectively.

FIG. 11 is a flow diagram of an exemplary method 1100 for implementing a forwarding policy in a manner consistent with the present invention. The forwarding policy might be implemented on routers of an IP network. In particular, when a new packet arrives at an IP router the method 1100 may obtain packet header information (Block 1105) and obtain the primary and backup port and primary port forwarding information according to the destination IP address of the received packet. (Block 1110) Next the method 1100 may examine whether the packet has encountered a failure having a failure distance greater than zero. (Block 1115) If the packet has encountered a failure having a failure distance greater than zero, then the method 1100 may determine the failure pattern that has occurred (Recall the method 900.) and select the appropriate output forwarding port. (Blocks 1115 and 1150) (The output port may be selected using the method 1200 of FIG. 12.)

Referring back to block 1115, if on the other hand, the packet has not encountered a failure having a failure distance greater than zero, then the method 1100 may further proceed to examine if the packet has encountered a primary port failure. (Block 1120) If the packet has not encountered a primary port failure, then the method 1100 may forward the packet through the router's primary port (Block 1145) before the method is left (Node 1155) On the other hand, if the packet has encountered a primary port failure, then the method 1100 checks again if the packet has encountered another failure. (Blocks 1120 and 1125) If the packet has not encountered another failure, then the method 1100 may assume that a failure pattern 1, 2, or 3 has occurred in the network. (Blocks 1125 and 1130) On the other hand, if the packet has encountered another failure, then the method 1100 may assume that a failure pattern 5 or 6 has occurred in the network. (Blocks 1125 and 1135)

Thereafter, the method 1100 may recognize that the packet has encountered a failure and its failure distance is zero, and the appropriate parameters in the packets header are set. (Block 1140) Subsequently, the method 1100 may determine the failure pattern that has occurred and select the appropriate output forwarding port before the method 1100 is left. (Blocks 1150 and 1155)

FIG. 12, which consists of FIGS. 12A, 12B, 12C, 12D, 12E, and 12F, is a flow diagram part of an exemplary method 1200 for selecting an appropriate forwarding port in a manner consistent with the present invention. The method 1200 may be invoked in response to a request by the method 1100 of FIG. 11. (Recall 1150 of FIG. 11.) When selecting the appropriate forwarding output port (i.e., first backup port, secondary backup port, or primary port) for a packet, the method 1200 may first determine a state of the packet based on the determined failure pattern and the exit link count. (Block 1202) This information may be obtained from the packet's header information. There are six states which may be represented by a packet's pk.s and pk.c covering all possible failure patterns and ensuring proper forwarding/output port selection. (Block 1204). After, determining the state of the packet, the method 1200 may proceed to the various state-specific operations, described below.

Figure 12A:
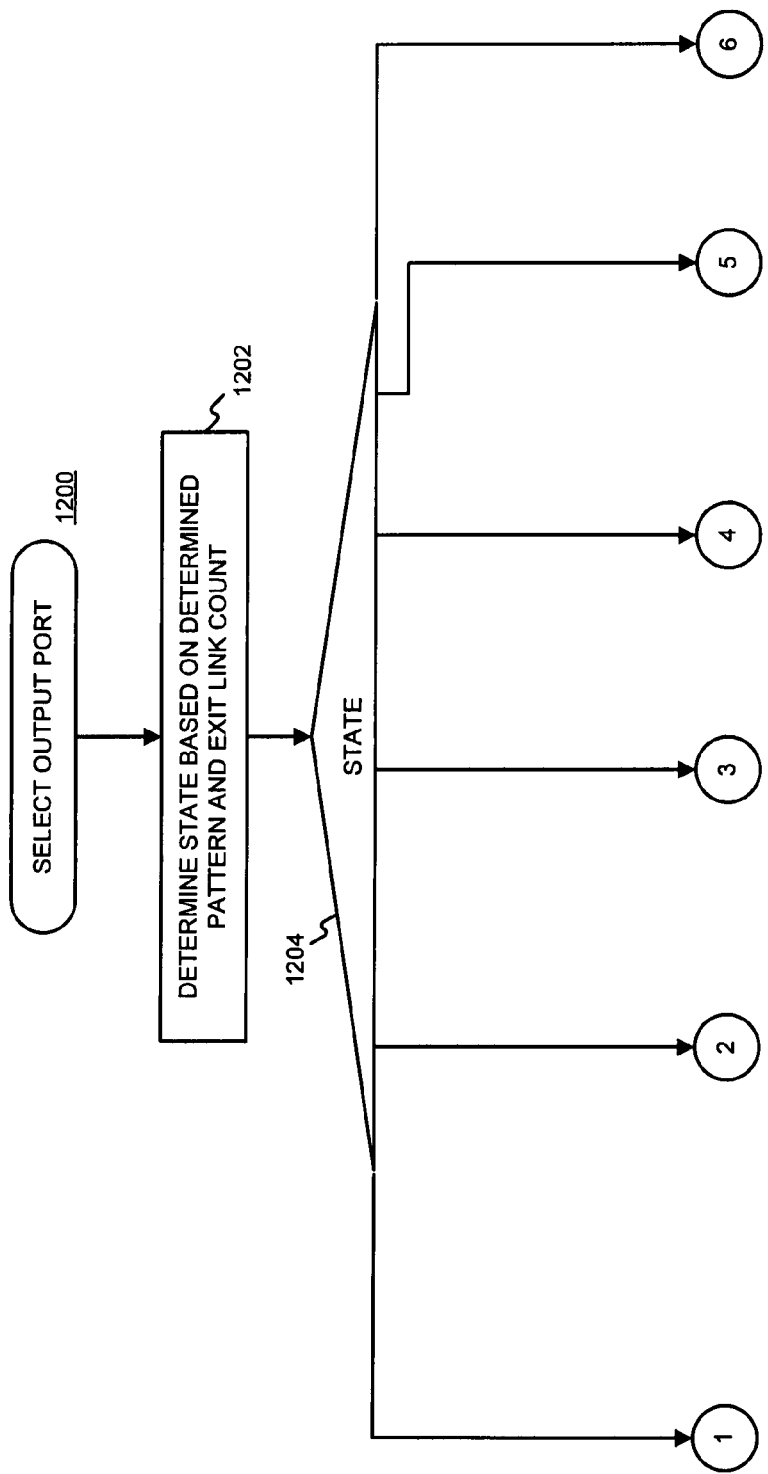
Figure 12B:
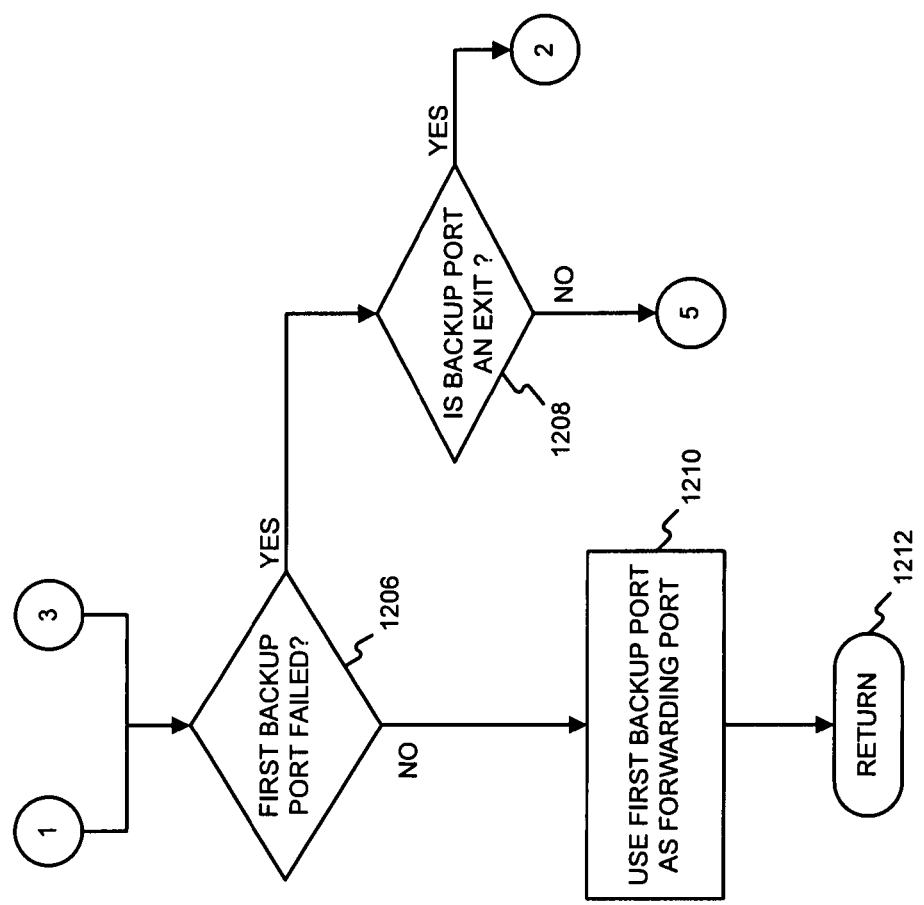

Referring to nodes 1 and 3 and FIG. 12B, if state 1 or 3 is determined, the method 1200 may check if the first backup port has failed. (Block 1206) If the first backup port has not failed, then the method 1200 may use the first backup port as the forwarding port before the method 1200 is left. (Block 1210 and Node 1212) If, on the other hand, the first backup port has failed, then the method 1200 may check if the first backup port is an exit. (Block 1208) If the first backup port is an exit then the method 1200 may follow, via node 2, the operations of state 2. Conversely, if the first backup port is not an exit, then the method 1200 may follow, via node 5, the operations of state 5. (Block 1208)

Figure 12C:
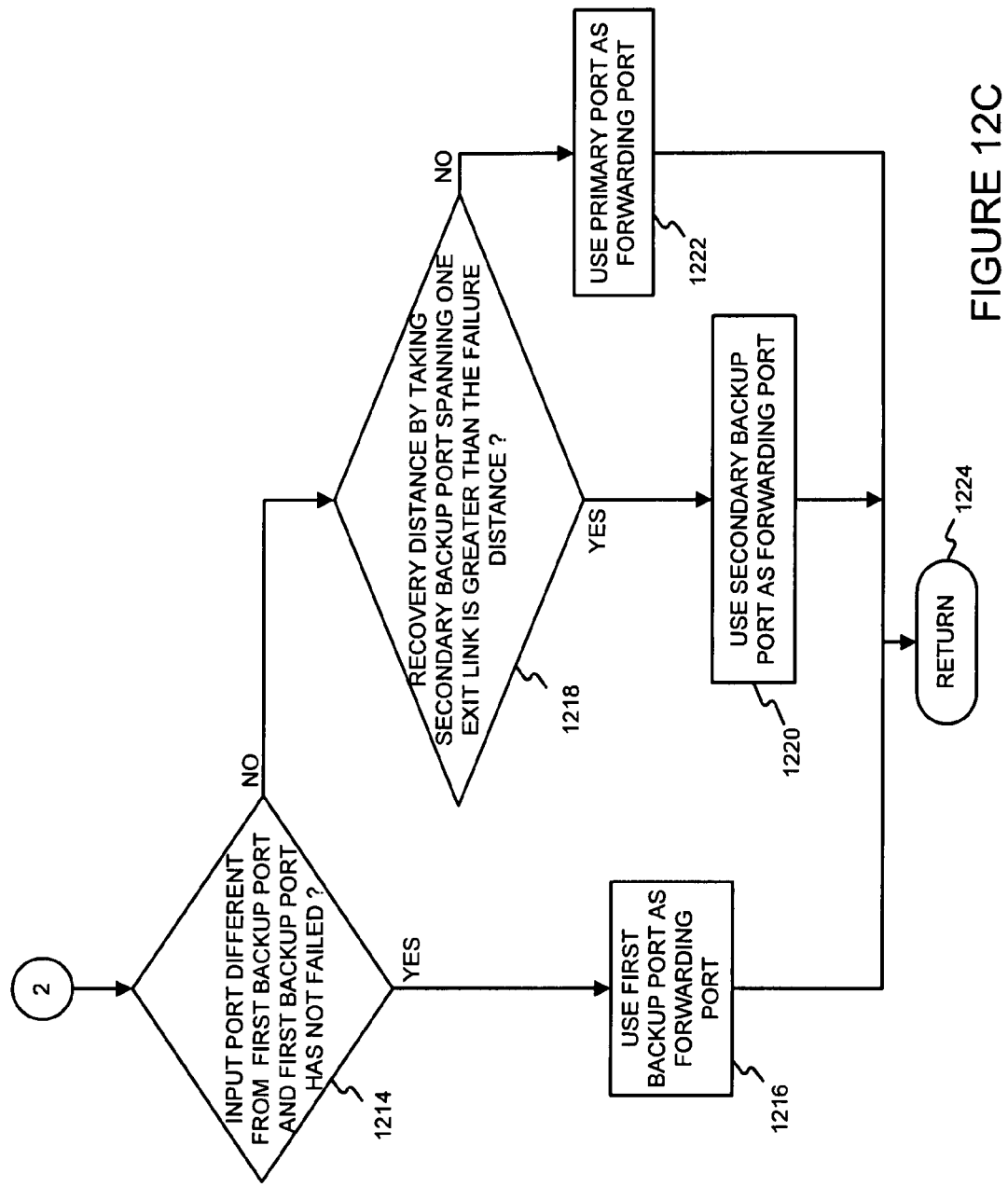

Referring to FIG. 12C, if state 2 was determined, the method 1200 may check if the input port is different from the first backup port and the first backup port has not failed. (Block 1214) If the input port is different from the first backup port and the first backup port has not failed, then the method 1200 may use the first backup port as the forwarding port (Block 1216) before the method 1200 is left (Node 1224) On the contrary, if the input port is not different from the first backup port and/or if the first backup port has failed, then the method 1200 may check whether the recovery distance by taking the secondary backup port spanning one exit link is greater than the failure distance. (Block 1218) If the recovery distance by taking the secondary backup port spanning one exit link is greater than the failure distance, then the method 1200 may use the secondary backup port as the forwarding port (Block 1220) before the method 1200 is left (Node 1224) However, if the recovery distance by taking the secondary backup port spanning one exit link is not greater than the failure distance, then the method 1200 may use the primary port as the forwarding port (Block 1222) before the method 1200 is left (Node 1224)

Figure 12D:
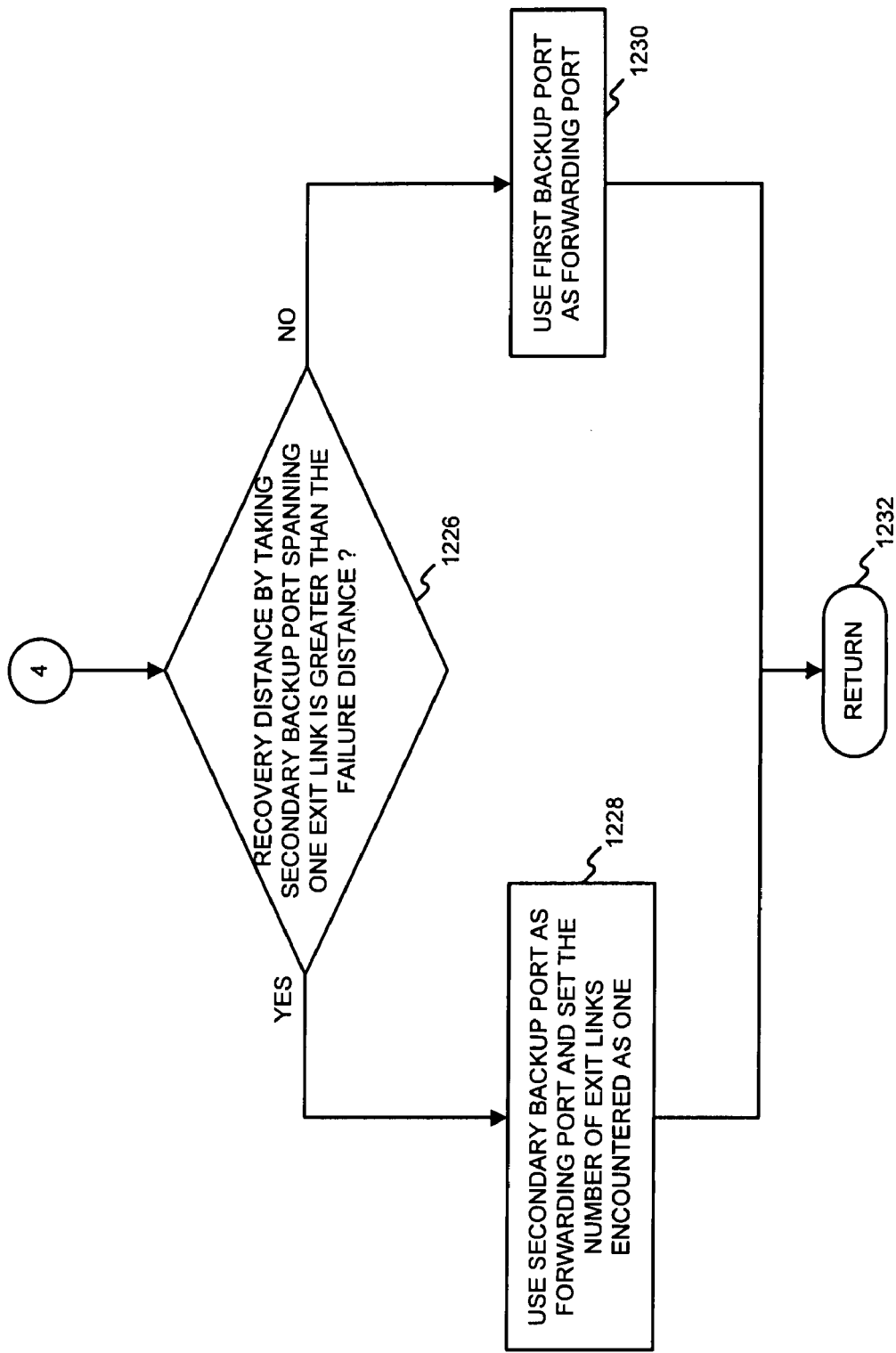

Referring to FIG. 12D, if state 4 was determined, the method 1200 may check whether the recovery distance by taking the secondary backup port spanning one exit link is greater than the failure distance. (Block 1226) If the recovery distance by taking the secondary backup port spanning one exit link is greater than the failure distance, then the method 1200 may use the secondary backup port as the forwarding port and set the number of exit links encountered as one (Block 1228) before the method 1200 is left (Node 1232). On the contrary, if the recovery distance by taking the secondary backup port spanning one exit link is not greater than the failure distance, then the method 1200 may use the first backup port as the forwarding port (Block 1230) before the method 1200 is left (Node 1232).

Figure 12E:
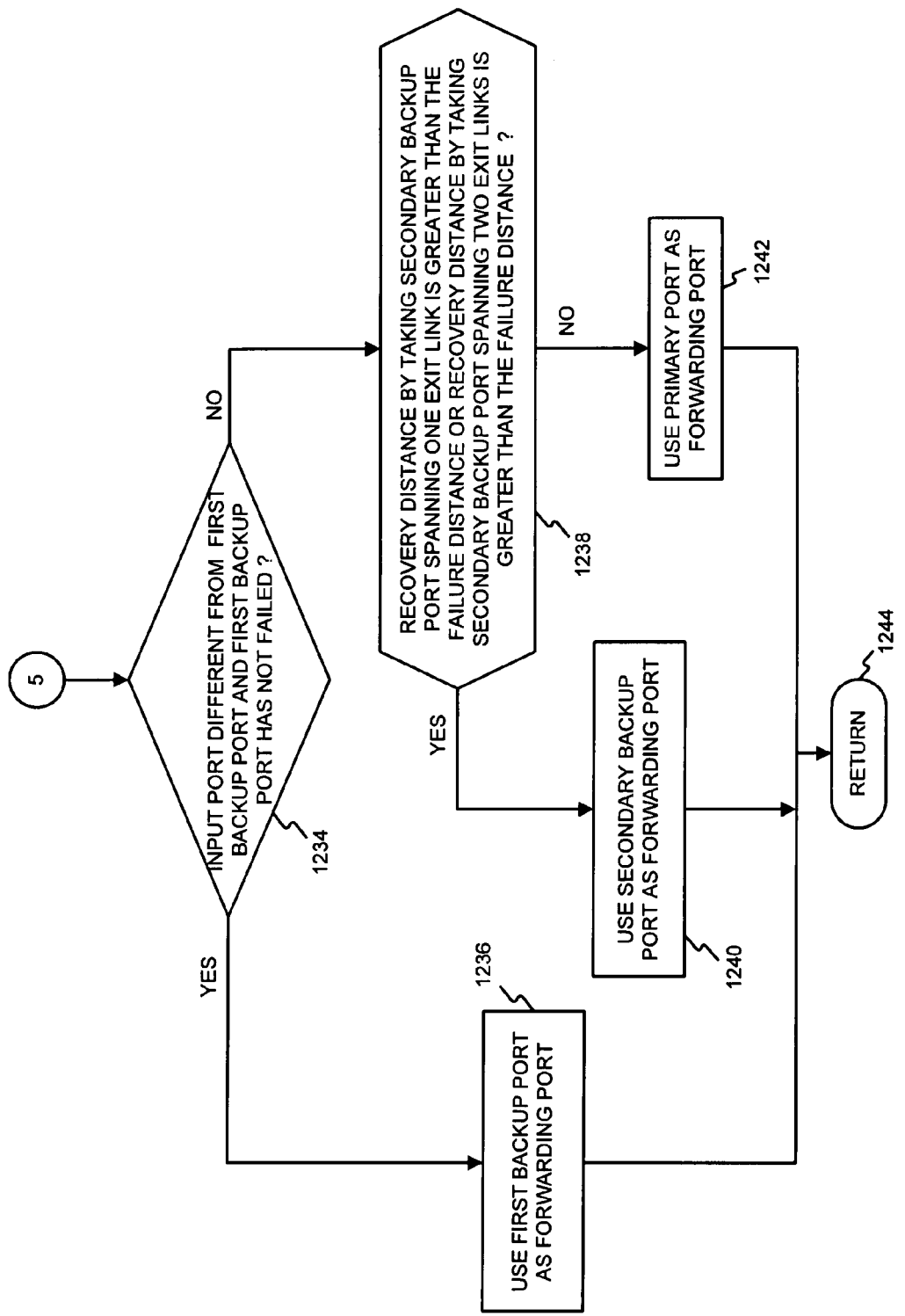

Referring to FIG. 12E, if state 5 was determined, the method 1200 may check whether the input port is different from the first backup port and the first backup port has not failed. (Block 1234) If the input port is different from the first backup port and the first backup port has not failed, then the method 1200 may use the first backup port as the forwarding port (Block 1236) before the method 1200 is left (Node 1244). On the other hand, if input port is not different from the first backup port, and/or if the first backup port has failed, then the method 1200 may check whether the recovery distance by taking the secondary backup port spanning one exit link is greater than the failure distance or the recovery distance by taking the secondary backup port spanning two exit links is greater than the failure distance. (Block 1328) If the recovery distance by taking the secondary backup port spanning one exit link is greater than the failure distance or the recovery distance by taking the secondary backup port spanning two exit links is greater than the failure distance, then the method 1200 may use the secondary backup port as the forwarding port (Block 1240) before the method 1200 is left (Node 1244). Otherwise, the method 1200 may use the primary port as the forwarding port. (Block 1242) before the method 1200 is left (Node 1244).

Figure 12F:
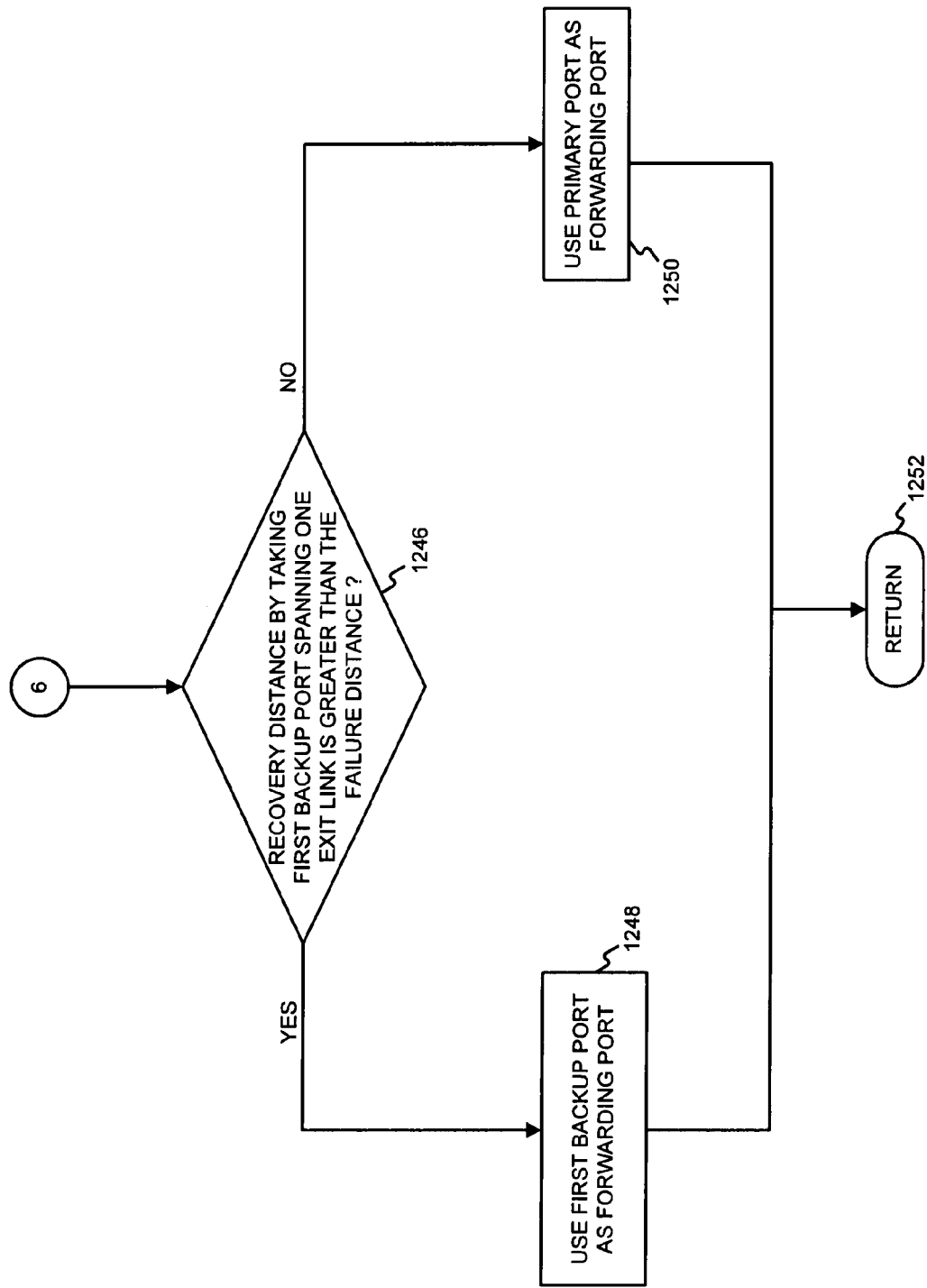

Finally, referring to FIG. 12F, if state 6 was determined, the method 1200 may check whether the recovery distance by taking the first backup port spanning one exit link is greater than the failure distance. (Block 1246) If the recovery distance by taking the first backup port spanning one exit link is greater than the failure distance, then the method 1200 may use the first backup port as the forwarding port (1248) before the method 1200 is left (Node 1252). Otherwise, the method 1200 may use the primary port as the forwarding port (Block 1250) before the method 1200 is left (Node 1252).

§4.4 Illustrative Example of Operations of Exemplary Process

FIGS. 13A-13E illustrate an IP network topology with a plurality of nodes having primary ports and the determination of their first and secondary backup ports in a manner consistent with the present invention. Node 1 is the destination node.

Figure 13B:
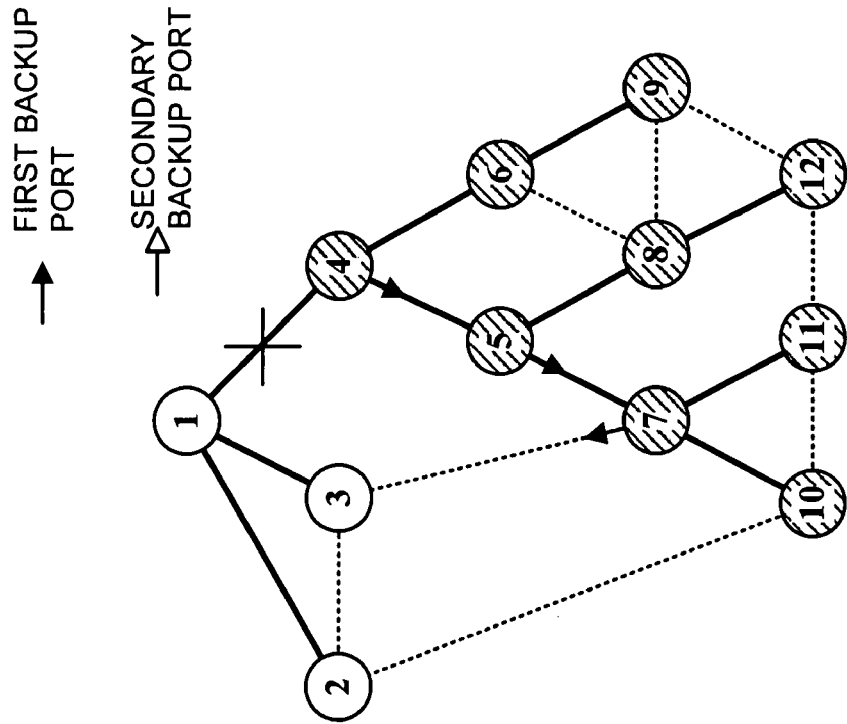
Figure 13A:
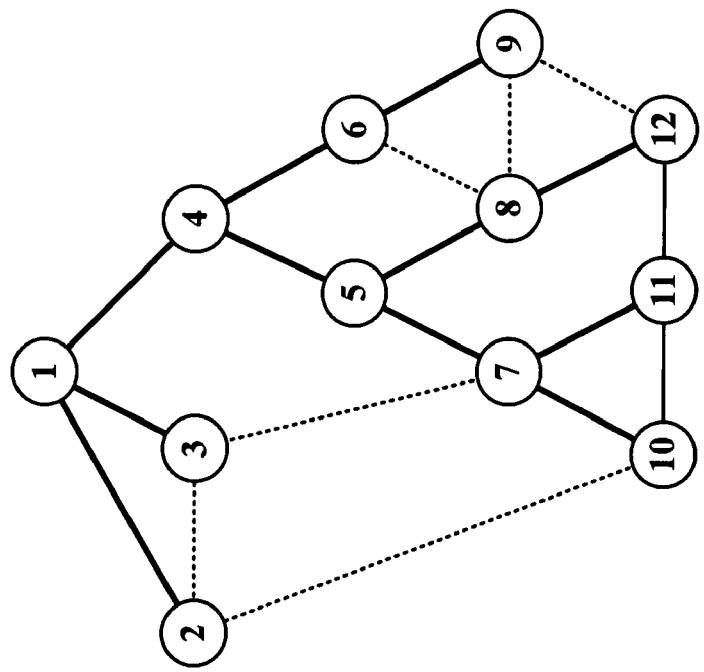

FIG. 13A illustrates the IP network topology with a plurality of nodes having primary ports depicted as thick bold lines between the nodes, where node 1 is the single destination. In order to determine the first and secondary backup ports for each router (node), a method consistent with the present invention may be employed which will sequentially determine first and secondary backup ports for each router (except node 1) in the network. The acts involved in determining the backup ports may be summarized by following the flow diagrams of FIGS. 5, 6, 7, and 8 or the detailed acts described above in §4.2. For instance, FIG. 13B illustrates the assumed failure (removal) of the link between node 4 and node 1 which creates a sub-tree T(4) illustrated by the black (hatched) nodes. Using a breadth-first search of the sub-tree T(4) in accordance with Process A ($1^{st}$ algorithm), a first exit node pointing to a white colored node 7→3 is found and the first backup path is 4→5→7→3→1. Thus, the first backup ports for node 4, node 5, and node 7 which is illustrated by thick solid arrows going from node 4 to node 5, node 5 to node 7, and from node 7 to node 3 respectively is determined.

Figure 13C:
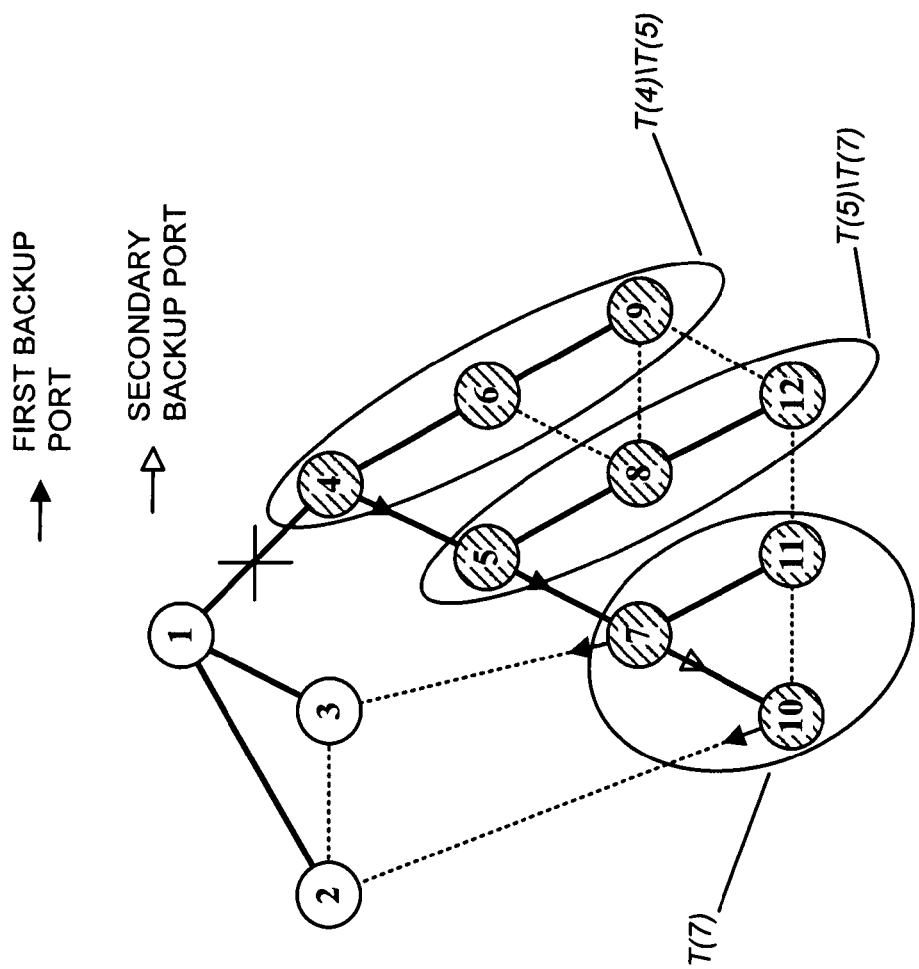
Figure 13E:
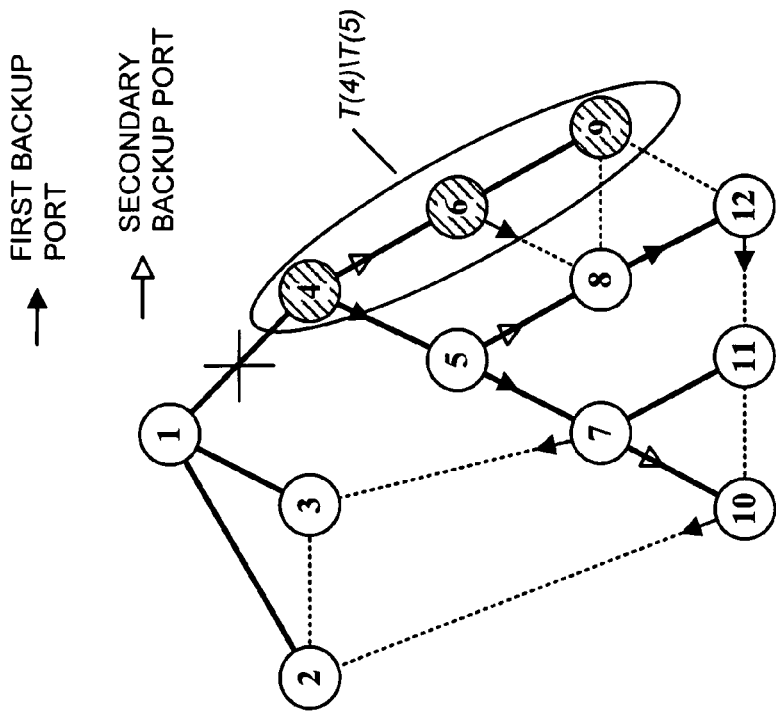
Figure 13D:
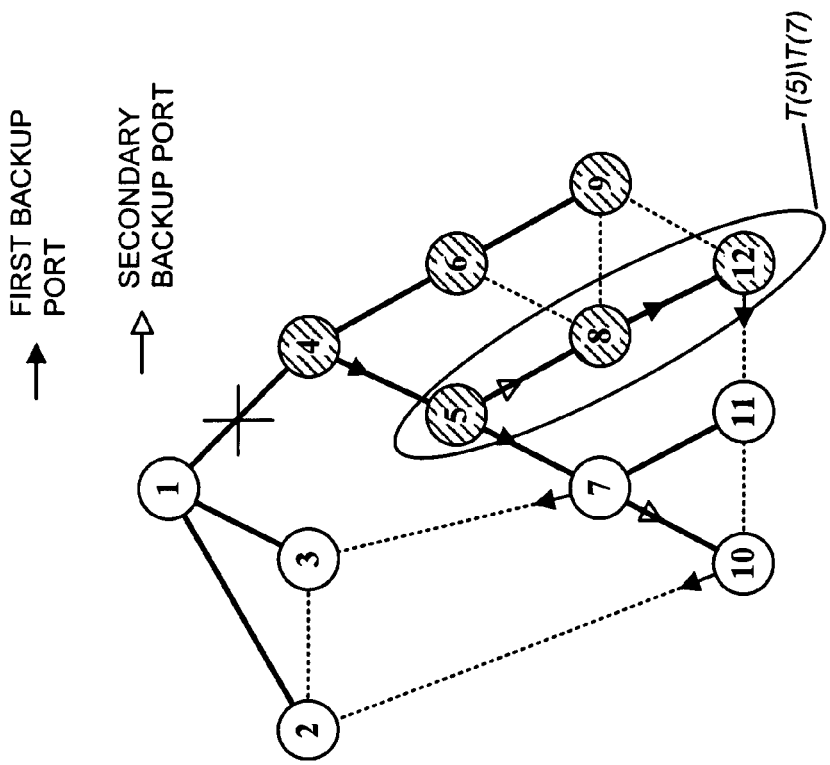

Continuing, Process B ($2^{nd}$ algorithm) is employed next wherein a secondary exit node may be determined resulting in a secondary backup path and the determination of secondary backup ports as well as first backup ports. In accordance with the acts of Process B, as illustrated in FIG. 13C, a breadth first search is performed on the sub-tree T(4)\(T5) in search for a second exit to a white node. No such result is found so a breadth first search is performed on sub-tree T(5)\T(7). Again no secondary exit to a white node is found. Still in accordance with the acts of Process B, a breadth first search is performed on sub-tree T(7) wherein a second exit pointing to a white colored resulting in the determination of the first backup port of node 10 and the secondary backup port of node 7. The first backup port of node 10 is illustrated by a thick solid arrow pointing from node 10 to node 2 and the secondary backup port of node 7 is illustrated by transparent arrow pointing from node 7 to node 10.

Continuing, Process C ($3^{rd}$ algorithm) is employed next wherein a double-exit backup path is determined and the determination of further secondary backup ports as well as first backup ports is accomplished. In accordance with the acts of Process C, illustrated in FIGS. 13D and 13E, sub-tree T(7) is dyed white (see FIG. 13D) and a breadth first search is performed on the sub-tree T(5)\T(7) in search for a further exit node to a white node. The search results in a further exit node which is node 12 and the double exit backup path 4→5→8→12→11→7→3→1. Thus node 5 is assigned a secondary backup port illustrated by a transparent arrow from node 5 to node 8, and nodes 8 and 12 are assigned a first backup port illustrated by thick solid arrows pointing from node 8 to node 12 and from node 12 to node 11 respectively. Still in accordance with the acts of Process C, sub-tree T(5) is dyed white (see FIG. 13E) and a breadth first search is performed on sub-tree T(4)\T(5) in search for a further exit node to a white node. The search results in a another further exit node which is node 6 and the double exit backup path 4→6→8→12→11→7→3→1. Thus node 4 is assigned a secondary backup port illustrated by a transparent arrow from node 4 to node 6, and node 6 is assigned a first backup port illustrated by a thick solid arrow pointing from node 6 to node 8.

Continuing will finally result in the determination of first and secondary backup ports for all nodes within the network. The final result of the exemplary method applied to the network is illustrated in FIG. 3B.

§4.5 Alternatives and Refinements

The exemplary embodiments described above are practical and can be implemented with the following extensions in various embodiments. First, in at least some embodiments consistent with the present invention, the route calculation is extended such that a router first finds the primary tree for each destination and then searches for its first and secondary backup ports accordingly. Second, in at least some embodiments consistent with the present invention, the forwarding table is extended such that each entry also contains the backup ports and their attributes, which looks like Table II. This extension requires additional storage. Nonetheless, the table lookup time remains the same since the primary, first/secondary ports can be stored in parallel memory banks. Third, in at least some embodiments consistent with the present invention, the forwarding policy of each router is modified to reflect the primary and secondary backup ports. Finally, inserting the additional tags in IP headers is feasible. In IPv4 (See J. Postel, Internet Protocol, RFC 791 (Standard) (September 1981) Updated by RFC 1349.), bit0 of the Flag (currently unused) can be assigned to pk.f. The eight-bit Type of Service (TOS) can be used for pk:s, pk:c and pk:l under link failure(s). Since pk:s and pk:c need three bits, pk:l can use the rest five bits to reach a maximum level of 31, which is sufficient in today's ASs.

Some embodiments consistent with the present invention may be used to provide fast rerouting-aware logical topology design in optical networks.

§4.6 Exemplary Apparatus

FIG. 14 is high-level block diagram of a machine 1400 that may perform one or more of the processes described above, and/or store information used and/or generated by such processes. The machine 1400 basically includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430. The one or more processors 1410 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1420 and/or may be received from an external source via one or more input interface units 1430.

In one embodiment, the machine 1400 may be one or more conventional personal computers, servers, or routers. In this case, the processing units 1410 may be one or more microprocessors. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1410 through an appropriate interface 1430 coupled to the system bus 1440. The output devices 1434 may include a monitor or other type of display device, which may also be connected to the system bus 1440 via an appropriate interface. In addition to (or instead of) the monitor, the personal computer may include other (peripheral) output devices (not shown), such as speakers and printers for example.

Thus, at least some features of the present invention may be implemented as computer-executable software (program instructions). Alternatively, or in addition, at least some features of the present invention may be implemented in hardware (e.g., as application specific integrated circuits (ASICS)).

§4.7 Conclusions

The exemplary processes guarantee 100% recovery from double-link failures. ESCAP-DL may be used for link-state routing (e.g., OSPF). The processes have low complexity and can be easily applied to practical networks to substantially shorten service disruption caused by failures. The recovery does not require advertising of failures throughout the network and can be done very quickly. Two backup ports in each router are sufficient to guarantee 100% coverage of double-link failures. This provides a lower bound of hardware complexity of the forwarding tables.

What is claimed is:

1. For use by a router in a survivable network portion, a computer-implemented method comprising:
   a) receiving a packet addressed to a destination node within the survivable network portion, wherein the packet includes an information indicating that the packet has encountered a failure; and
   b) selecting one of (A) a primary port, (B) a primary backup port and (C) a secondary backup port on which to forward the received packet, such that, in the event of a double link failure, a backup path with no dead loops is defined,
      wherein the act of selecting one of (A) a primary port, (B) a primary backup port and (C) a secondary backup port for local rerouting includes
      1) identifying a pattern of the failure; and
      2) selecting, using a forwarding policy associated with the identified pattern, one of (A) a primary port, (B) a primary backup port and (C) a secondary backup port to use for forwarding.

2. The computer-implemented method of claim 1 wherein the pattern of the failure indicates that a second link failure does not affect a backup path used by a sub-graph 3 defined by a first link failure.

3. The computer-implemented method of claim 1 wherein the pattern of the failure indicates that a second link failure is on an exit link of a backup path used by a sub-graph defined by the first link failure.

4. The computer-implemented method of claim 3 wherein the pattern of the failure indicates that first and second link failures create two sub-graphs separated from a graph which includes the destination node, and wherein the two sub-graphs are separated from each other.

5. The computer-implemented method of claim 1 wherein a first link failure defines a graph including the destination node and a disconnected sub-graph, and wherein the pattern of the failure indicates that a second link failure creates a further sub-graph within the defined sub-graph.

6. For use by a router in a survivable network portion, apparatus comprising:
   a) means for receiving a packet addressed to a destination node within the survivable network portion, wherein the packet includes an information indicating that the packet has encountered a failure; and
   b) means for selecting one of (A) a primary port, (B) a primary backup port and (C) a secondary backup port on which to forward the received packet, such that in the event of a double link failure, a backup path with no dead loops is defined,
      wherein the means for selecting one of (A) a primary port, (B) a primary backup port and (C) a secondary backup port for local rerouting include
      1) means for identifying a pattern of the failure; and
      2) means for selecting, using a forwarding policy associated with the identified pattern, one of (A) a primary port, (B) a primary backup port and (C) a secondary backup port to use for forwarding.

7. The apparatus of claim 6 wherein the pattern of the failure indicates that a second link failure does not affect a backup path used by a sub-graph defined by a first link failure.

8. The apparatus of claim 6 wherein the pattern of the failure indicates that a second link failure is on an exit link of a backup path used by a sub-graph defined by the first link failure.

9. The apparatus of claim 6 wherein the pattern of the failure indicates that first and second link failures create two sub-graphs separated from a graph which includes the destination node, and wherein the two sub-graphs are separated from each other.

10. The apparatus of claim 6 wherein a first link failure defines a graph including the destination node and a disconnected sub-graph, and wherein the pattern of the failure indicates that a second link failure creates a further sub-graph within the defined sub-graph.

* * * * *